(12) United States Patent
Peng et al.

(10) Patent No.: US 6,959,672 B1
(45) Date of Patent: Nov. 1, 2005

(54) FUEL INJECTION FOR A FREE PISTON ENGINE

(75) Inventors: Lixin Peng, Rochester Hills, MI (US); Peter Hofbauer, West Bloomfield, MI (US); Jialin Yang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/853,409

(22) Filed: May 25, 2004

(51) Int. Cl.[7] ............................................. F02B 71/00
(52) U.S. Cl. ................. 123/46 R; 123/46 B
(58) Field of Search ............................. 123/46 R, 46 B

(56) References Cited

U.S. PATENT DOCUMENTS

| | | | |
|---|---|---|---|
| 3,835,824 A * | 9/1974 | MacDonald | 123/46 R |
| 4,048,970 A * | 9/1977 | Fitzgerald | 123/46 R |
| 4,244,331 A * | 1/1981 | Mettier | 123/46 B |
| 5,213,067 A | 5/1993 | Kramer | |
| 5,287,827 A * | 2/1994 | Almendinger et al. | 123/46 R |
| 5,775,273 A * | 7/1998 | Beale | 123/46 B |
| 6,105,541 A | 8/2000 | Berlinger | |
| 6,135,069 A | 10/2000 | Fenelon et al. | |
| 6,170,443 B1 | 1/2001 | Hofbauer | |
| 6,318,309 B1 | 11/2001 | Burrahm et al. | |
| 2002/0134324 A1 * | 9/2002 | Wechner | 123/46 R |
| 2003/0051682 A1 | 3/2003 | Achten | |

OTHER PUBLICATIONS

Achten, A Review of Free Piston Engine Concepts, Sep. 12, 1994, pp. 1-12, SAE Technical Paper Series, 94-1776.

* cited by examiner

Primary Examiner—Erick Solis
(74) Attorney, Agent, or Firm—David B. Kelley; MacMillan, Sobanski & Todd

(57) ABSTRACT

A free piston engine is configured with a pair of opposed engine cylinders located on opposite sides of a fluid pumping assembly. An inner piston assembly includes a pair of inner pistons, one each operatively located in a respective one of the engine cylinders, with a push rod connected between the inner pistons. The push rod extends through an inner pumping chamber in the fluid pumping assembly and forms a fluid plunger within this chamber. An outer piston assembly includes a pair of outer pistons, one each operatively located in a respective one of the engine cylinders, with at least one pull rod connected between the outer pistons. The pull rod extends through an outer pumping chamber in the fluid pumping assembly and forms a fluid plunger within this chamber. The movement of the inner and outer piston assemblies during engine operation will cause the fluid plungers to pump fluid from a low pressure container into a high pressure chamber as a means of storing the energy output from the engine. Alternatively, the piston assemblies may drive a linear alternator. Each fuel injector is located so that it injects directly into its cylinder near the intake ports, while also being covered during combustion events in order to avoid exposing the fuel injector to the harsh environment of combustion.

18 Claims, 14 Drawing Sheets

FUEL INJECTION FOR A FREE PISTON ENGINE

BACKGROUND OF INVENTION

The present invention relates to free piston engines.

Conventionally, internal combustion engines have operated with the motion of the pistons mechanically fixed. For example, a conventional internal combustion engine for a motor vehicle includes a crankshaft and connecting rod assemblies that mechanically determine the motion of each piston within its respective cylinder. This type of engine is desirable because the position of each piston is know for any given point in the engine cycle, which simplifies timing and operation of the engine. While these conventional types of engines have seen great improvements in efficiency in recent years, due to the nature of the engines, that efficiency is still limited. In particular, the power density is limited because the mechanically fixed motion of the pistons fixes the compression ratio. Moreover, all of the moving parts that direct the movement of the pistons (and camshafts and engine valves as well) create a great deal of friction, which takes energy from the engine itself to overcome. The resulting lower power density means that the engine will be larger and heavier than is desired. Also, the flexibility in the engine design and packaging is limited because of all of the mechanical connections that must be made.

Some crankshaft engines employ direct injection of fuel into the cylinders. While this direct injection can be employed advantageously to further improve the engine operation, the fuel injectors and injector system operating them are generally very expensive. In particular, the injection generally must be accomplished with a very high fuel pressure, which can require an expensive system to generate and control the fuel under these high pressures. Moreover, each fuel injector nozzle is directly exposed to the extreme heat and pressures of the entire combustion event in its cylinder, thus requiring a relatively expensive fuel injector design to withstand these harsh environmental conditions.

Consequently, is desirable, for environmental and other reasons, to have an engine with a higher power density than these conventional engines. The advantages of lighter relative weight, smaller package size, and improved fuel efficiency can be a great advantage in both vehicle and stationary power production applications.

Another type of internal combustion engine is a free piston engine. This is an engine where the movement of the pistons in the cylinders is not mechanically fixed. The movement is controlled by the balance of forces acting on each piston at any given time. Since the motion is not fixed, the engines can have variable compression ratios, which allow for more flexibility in designing the engine's operating parameters. Also, since there are no conventional crankshafts and rods attached to the crankshaft, which reduces piston side force, there is generally less friction produced during engine operation. Moreover, an opposed piston, opposed cylinder (OPOC) configuration of a free piston engine is desirable due to its generally inherently balanced operation, with a compact layout as well. A particularly advantageous way to operate such an engine is with a two stroke combustion cycle—and even more advantageous is to operate with a homogeneous charge, compression ignition (HCCI) type of combustion, which takes best advantage of the ability to operate the engine with a variable compression ratio, in order to further increase the power density of the engine.

However, one concern, in particular, arises, and that is how to inject fuel into such a configuration while maintaining the fuel efficiency and minimizing the cost and complexity of such an engine.

SUMMARY OF INVENTION

In its embodiments, the present invention contemplates a free piston engine including an energy generation and control assembly having a first side; and a first combustion cylinder assembly located adjacent to the first side and including a first cylinder liner having a generally cylindrical wall that defines a first engine cylinder, which is centered about an axis of motion, and with the wall including at least one intake port and a fuel injector bore, adjacent to the at least one intake port, extending therethrough. The free piston engine also preferably includes a fuel injector having an injector nozzle and being mounted to the engine such that the injector nozzle is located in the fuel injector bore; and a piston assembly including a first piston having a head portion, an opposed rear portion and a cylindrical side wall extending therebetween, with the cylindrical side wall generally centered about and extending in the direction of the axis of motion, and with the first piston being located and telescopically slidable within the first engine cylinder along the axis of motion a generally predetermined distance that defines a piston stroke; and wherein the locations in the wall of the at least one intake port and the fuel injector bore are such that the cylindrical side wall will cover the at least one intake port and the fuel injector bore for only a portion of the piston stroke.

In its embodiments, the present invention preferably also contemplates a method of operating a free piston engine comprising the steps of: providing an energy generation and control assembly having a first side; providing a first combustion cylinder assembly located adjacent to the first side and including a first cylinder liner having a generally cylindrical wall that defines a first engine cylinder, which is centered about an axis of motion, and with the wall including at least one intake port and a fuel injector bore, adjacent to the at least one intake port, extending therethrough; providing a fuel injector having an injector nozzle and being mounted to the engine such that the injector nozzle is located in the fuel injector bore; providing a piston assembly including a first piston having a head portion, an opposed rear portion and a cylindrical side wall extending therebetween, with the cylindrical side wall generally centered about and extending in the direction of the axis of motion, and with the first piston being located and telescopically slidable within the first engine cylinder along the axis of motion; moving the first piston along the axis of motion so that the cylindrical side wall does not cover the fuel injector bore; injecting fuel from the fuel injector into the first engine cylinder while the cylindrical side wall is not covering the fuel injector bore; moving the first piston along the axis of motion so that the cylindrical side wall is covering the fuel injector bore; and igniting the injected fuel while the cylindrical side wall is covering the fuel injector bore.

An advantage of an embodiment of the present invention is that a free piston engine, with an inherent ability to more easily vary the an opposed piston, opposed cylinder (OPOC) configuration of a free piston engine allows for a more inherently balanced free piston engine, while also being conducive for effective homogeneous charge, combustion ignition (HCCI) engine operation. Such an engine can operate with relatively few major moving parts, generally having less overall friction to overcome during engine operation than a crank engine.

Another advantage of an embodiment of the present invention is that the fuel injector assembly will inject the fuel directly into an engine cylinder while not exposing the fuel injector nozzle to the extreme temperatures and pressures present at the initial portion of a combustion event. Thus, a relatively less costly fuel injector may be employed than a direct injection system where the fuel injector nozzle is exposed to the entire combustion event.

A further advantage of an embodiment of the present invention is that, the fuel is injected into an engine cylinder of a two stroke engine that does not employ intake or exhaust valves, yet the engine minimizes unburned fuel escaping through the exhaust ports by permitting late injection of fuel just prior to the close of the exhaust port, thus not allowing time for the fuel to reach the exhaust port before it closes.

An additional advantage of an embodiment of the present invention is that a fine mist, low penetration injector can be utilized to allow a cloud of fuel to form at the center of the cylinder bore and avoid fuel contacting the opposite side wall, thus promoting a homogeneous air fuel mixture, especially when combined with port induced air swirl motion.

An additional advantage of an embodiment of the present invention is that the engine allows for the fuel and air introduced into the cylinder to have a relatively long time to mix, thus assuring a more homogeneous fuel/air mixture than previous direct injection types of engines. Moreover, in general, the fuel may be injected under a relatively low pressure as compared to conventional direct injection types of engines.

DETAILED DESCRIPTION

Figure 1:
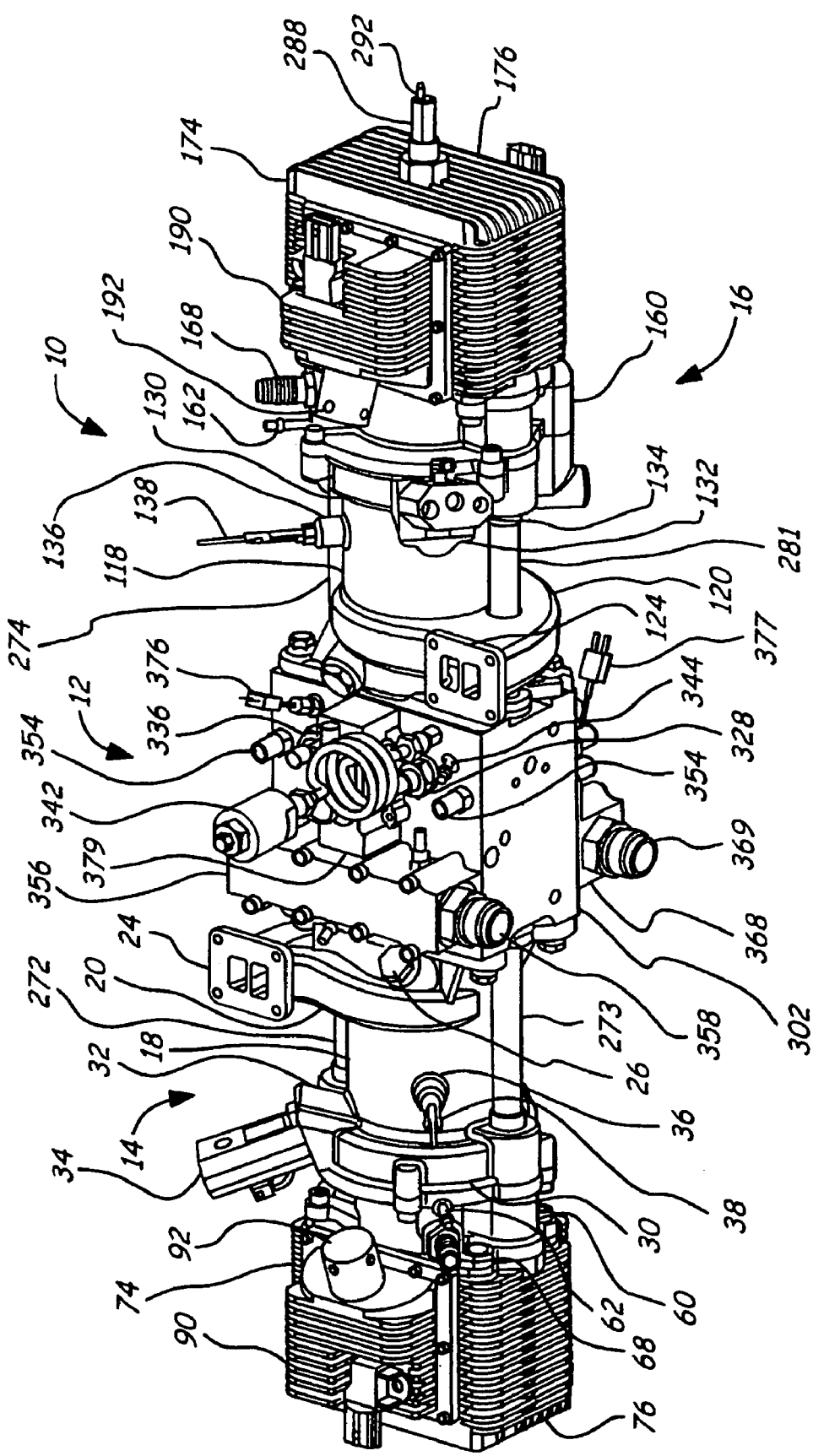
FIG. 1 is a perspective view of an opposed piston, opposed cylinder, free piston engine with hydraulic control and output, in accordance with the present invention.
Figure 2:
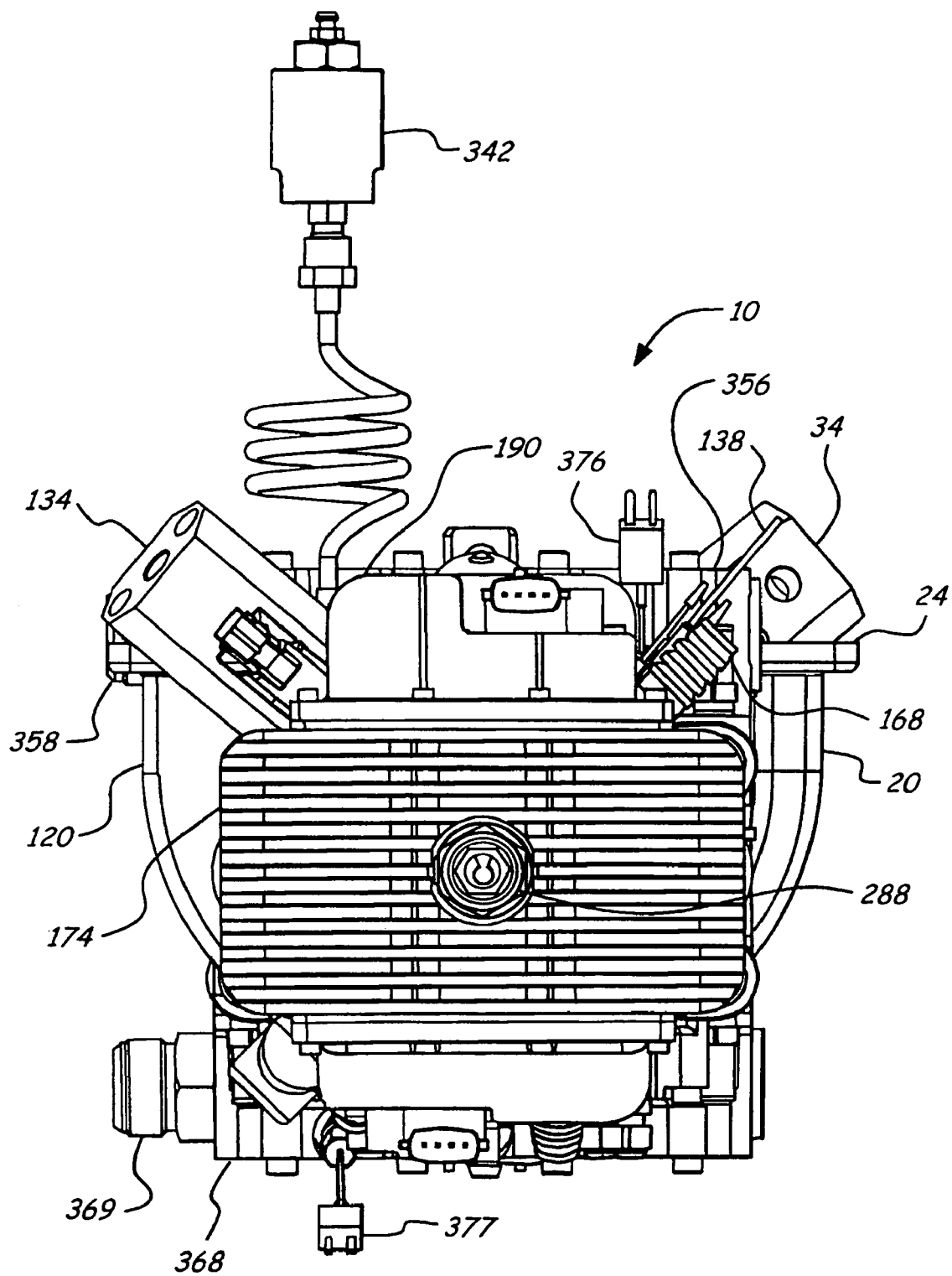
FIG. 2 is an end view of the engine of FIG. 1.
Figure 3A:
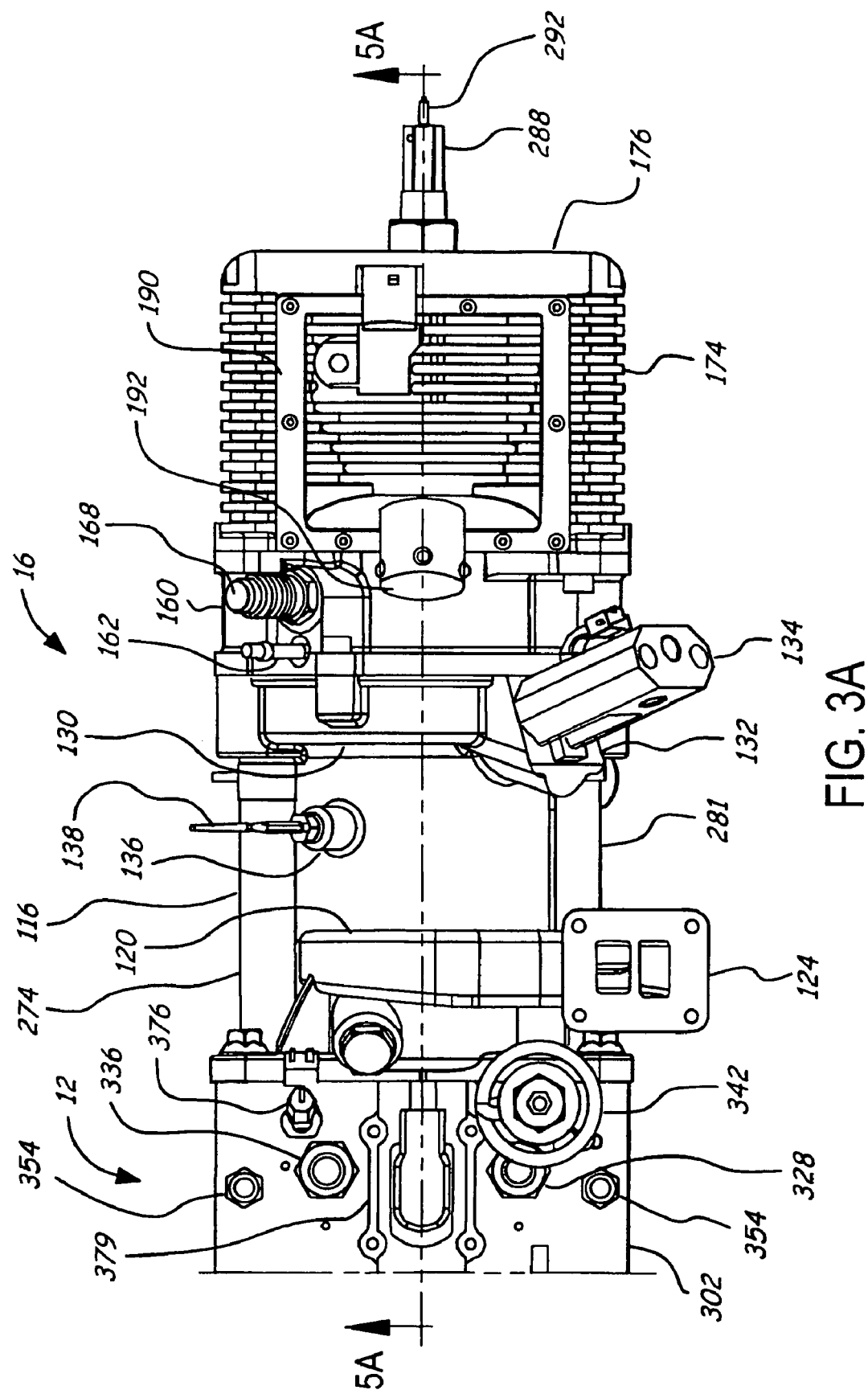
FIGS. 3A and 3B are a top, plan view of the engine of FIG. 1.
Figure 3B:
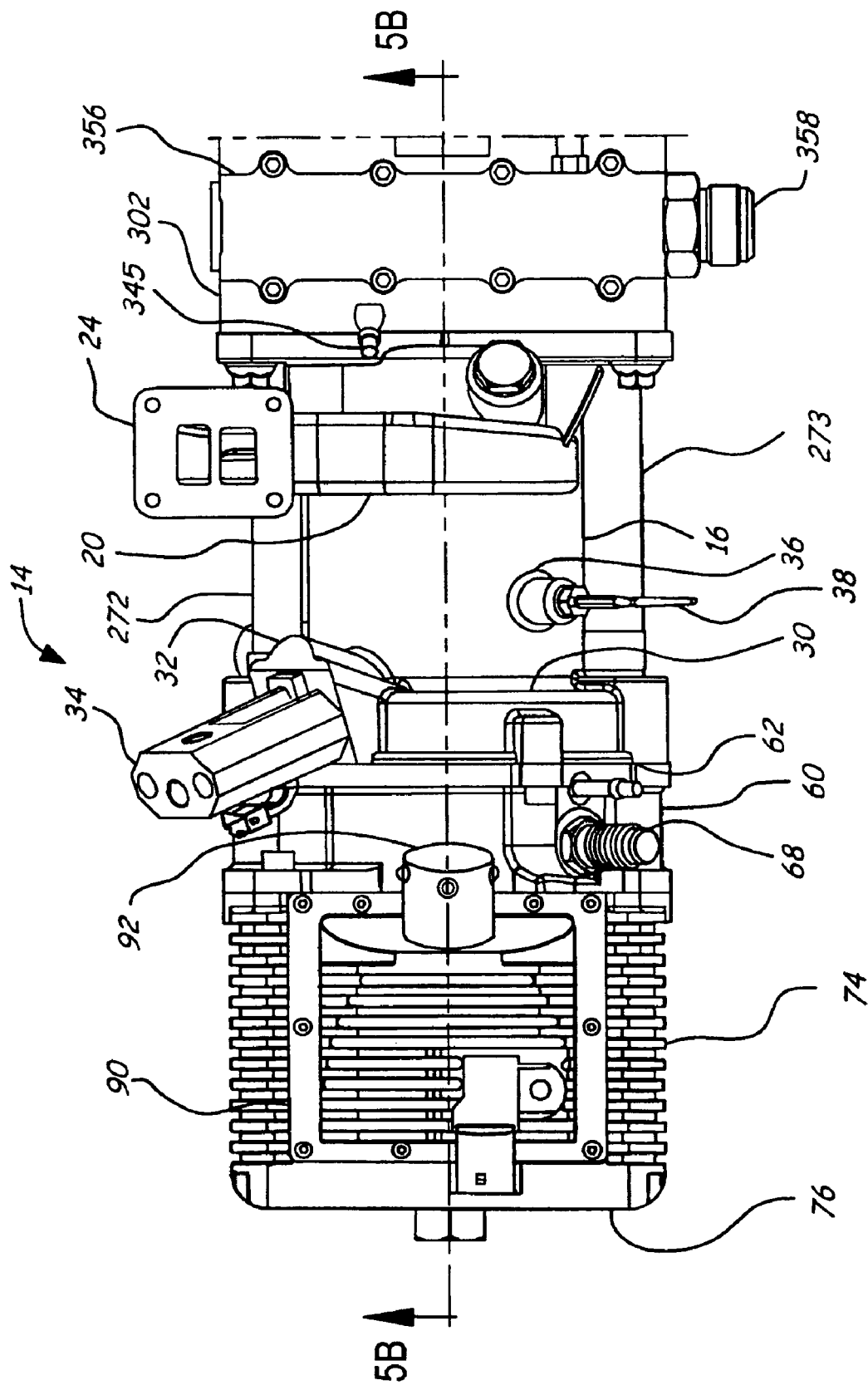
Figure 4A:
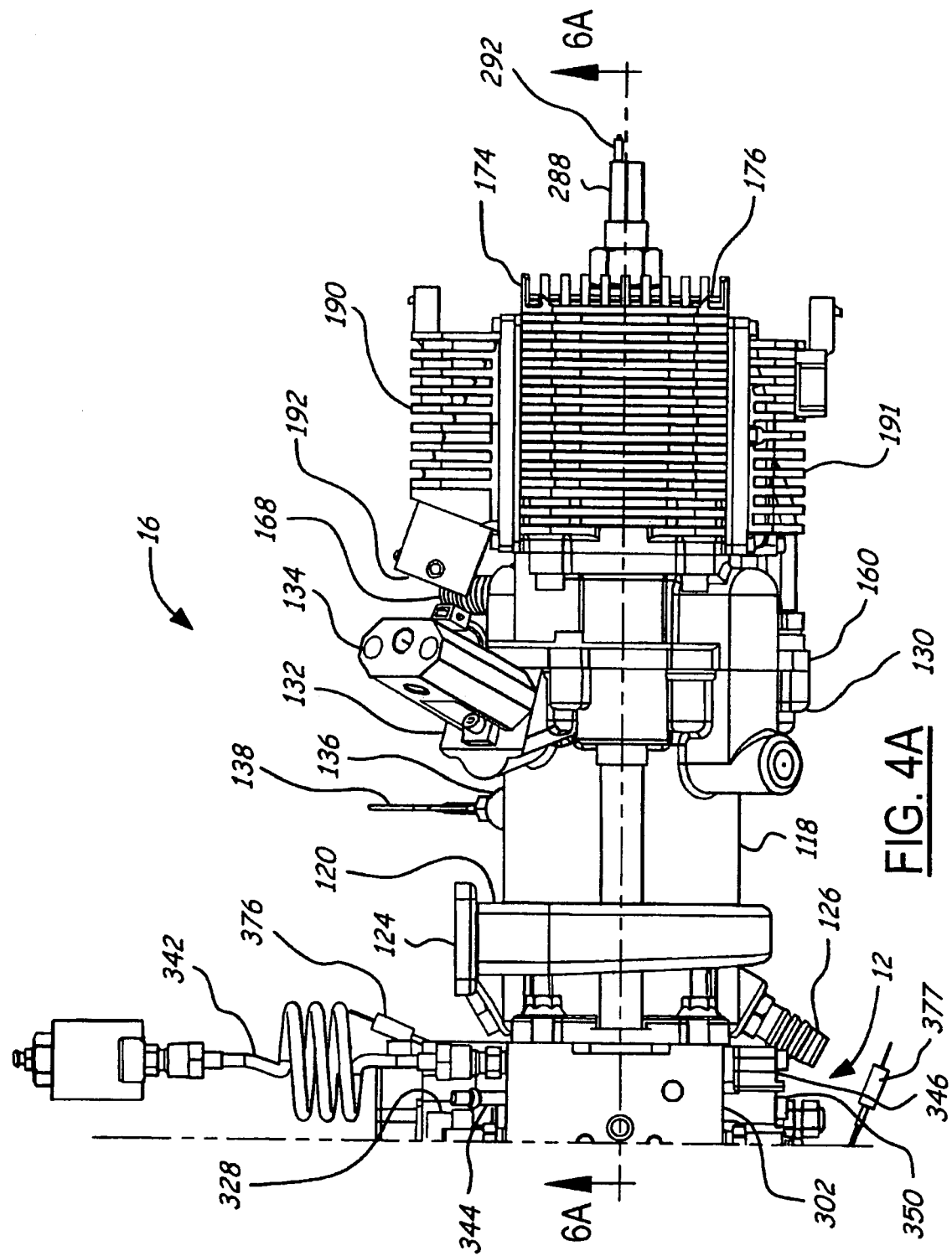
FIGS. 4A and 4B are a side view of the engine of FIG. 1.
Figure 4B:
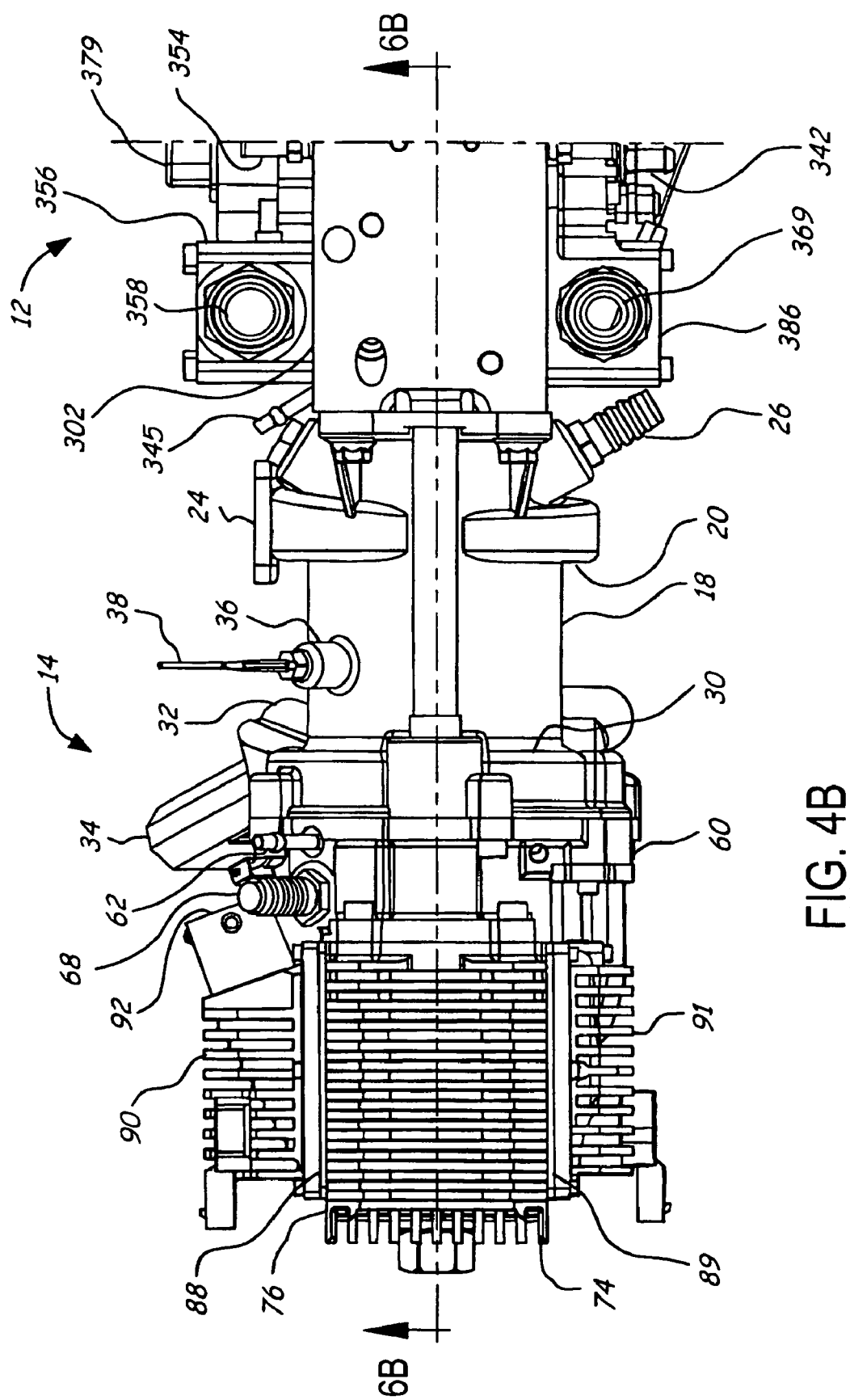
Figure 5A:
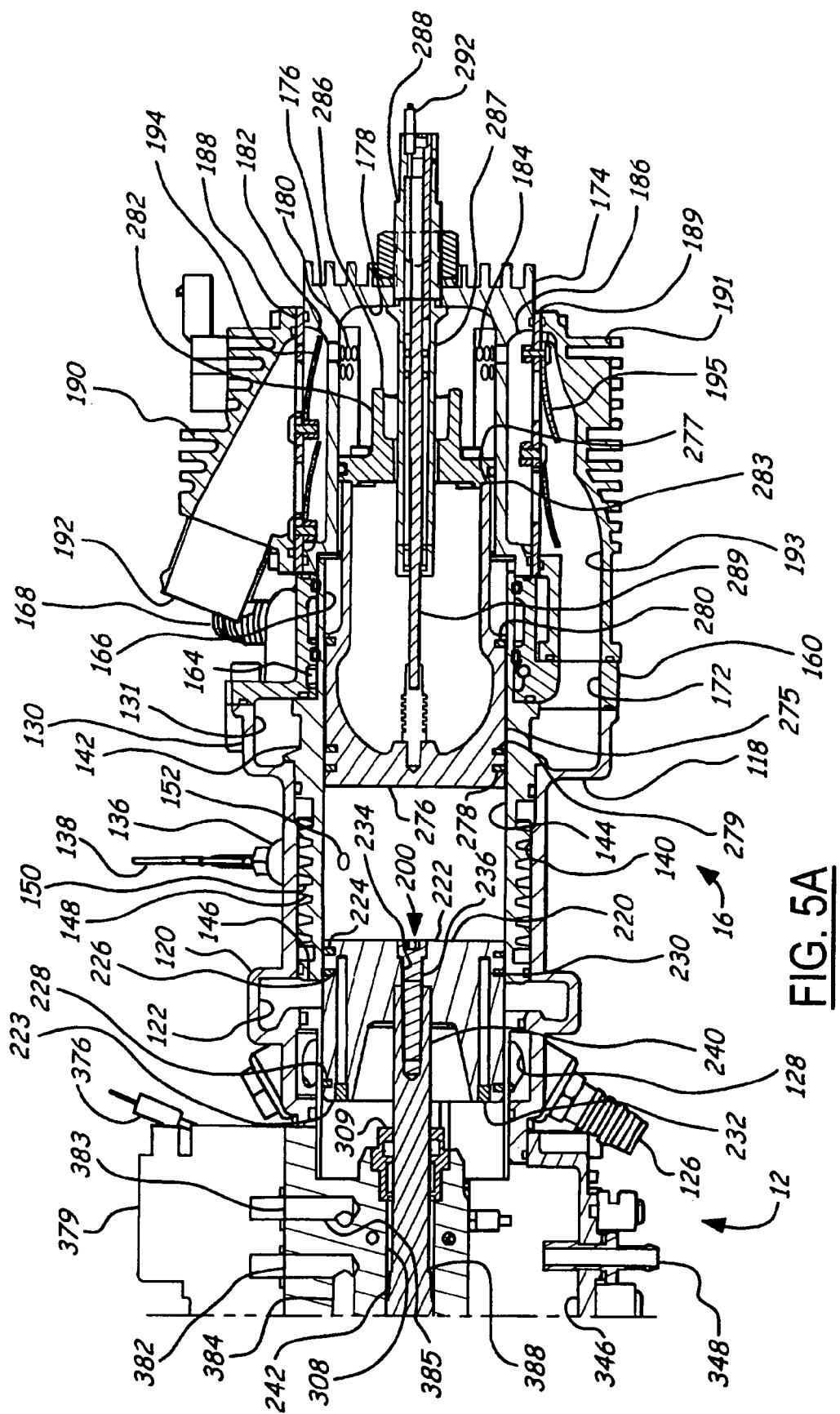
FIG. 5A is a sectional view of the engine taken along line 5A—5A in FIG. 3A.
Figure 5B:
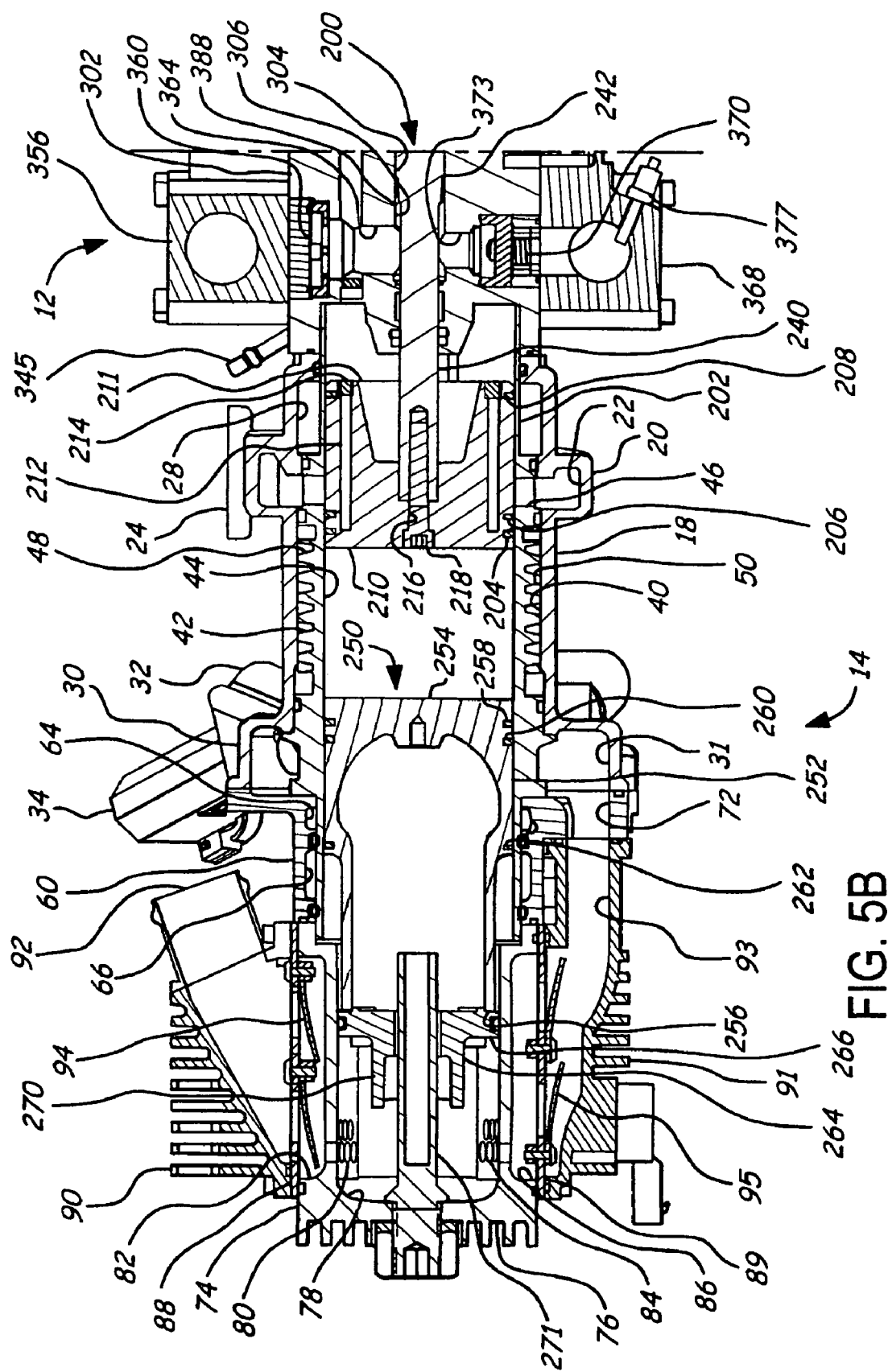
FIG. 5B is a sectional view of the engine taken along line 5B—5B in FIG. 3B.
Figure 6A:
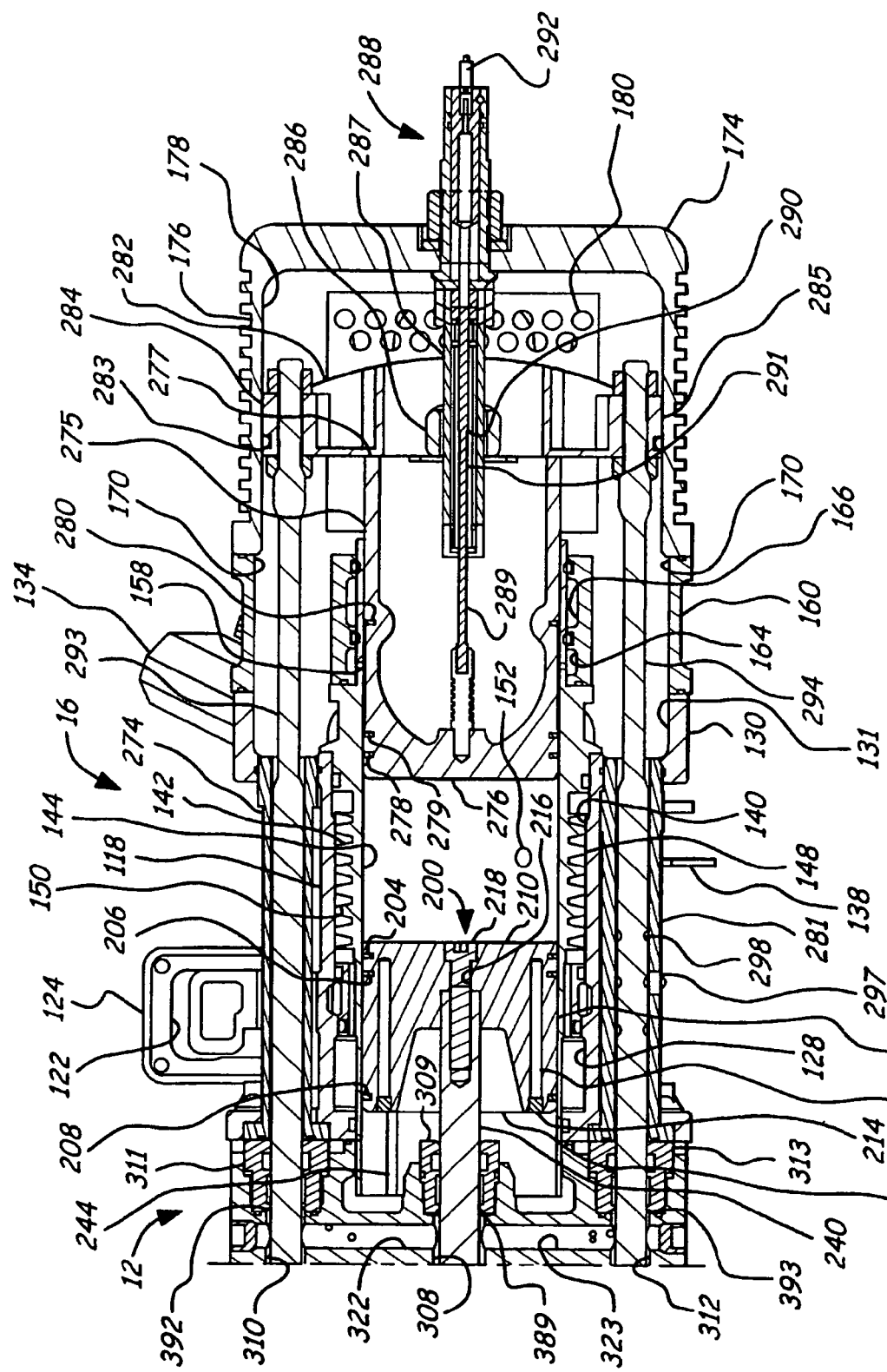
FIG. 6A is a sectional view of the engine taken along line 6A—6A in FIG. 4A.
Figure 6B:
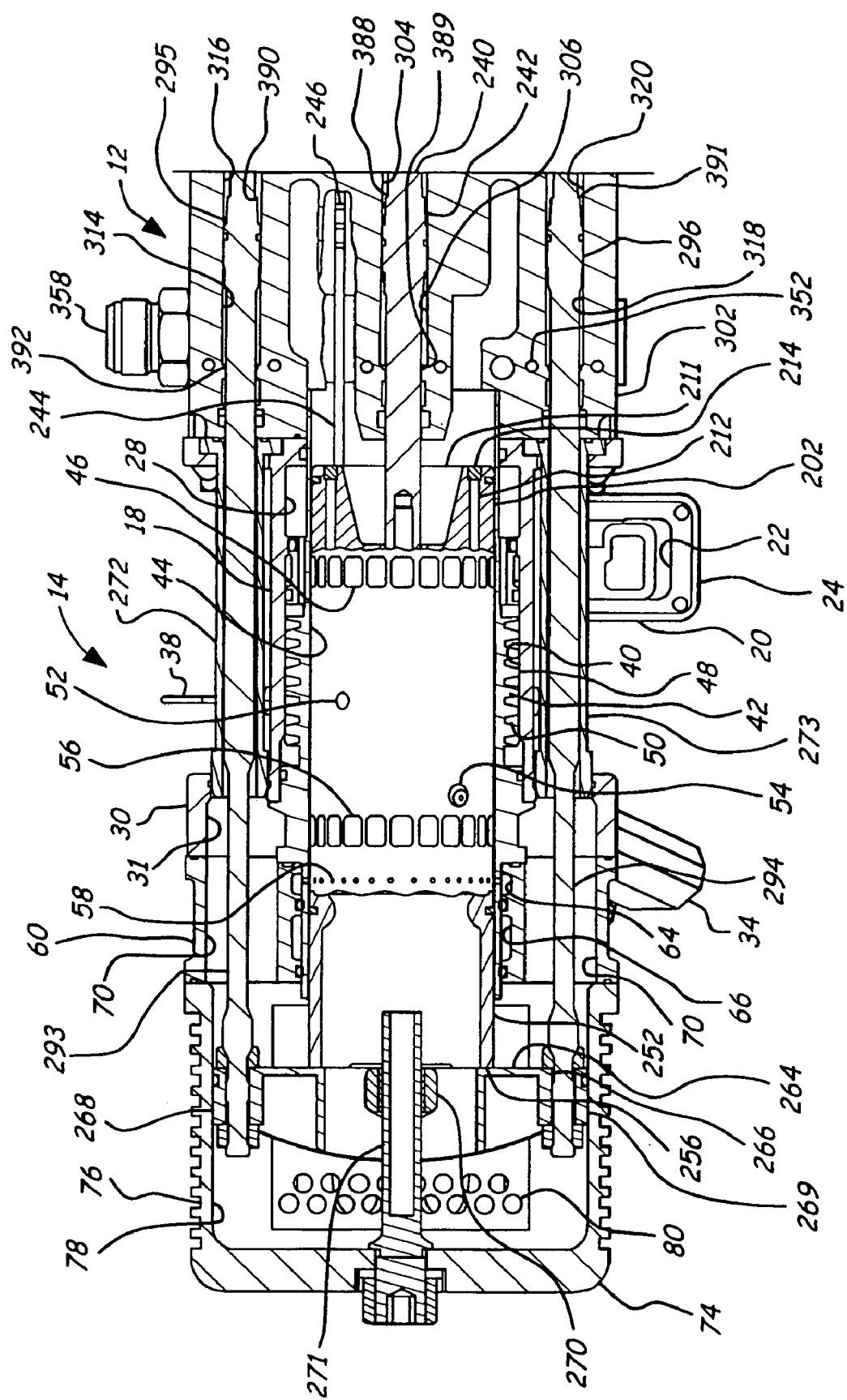
FIG. 6B is a section view of the engine taken along line 6B—6B in FIG. 4B.
Figure 7:
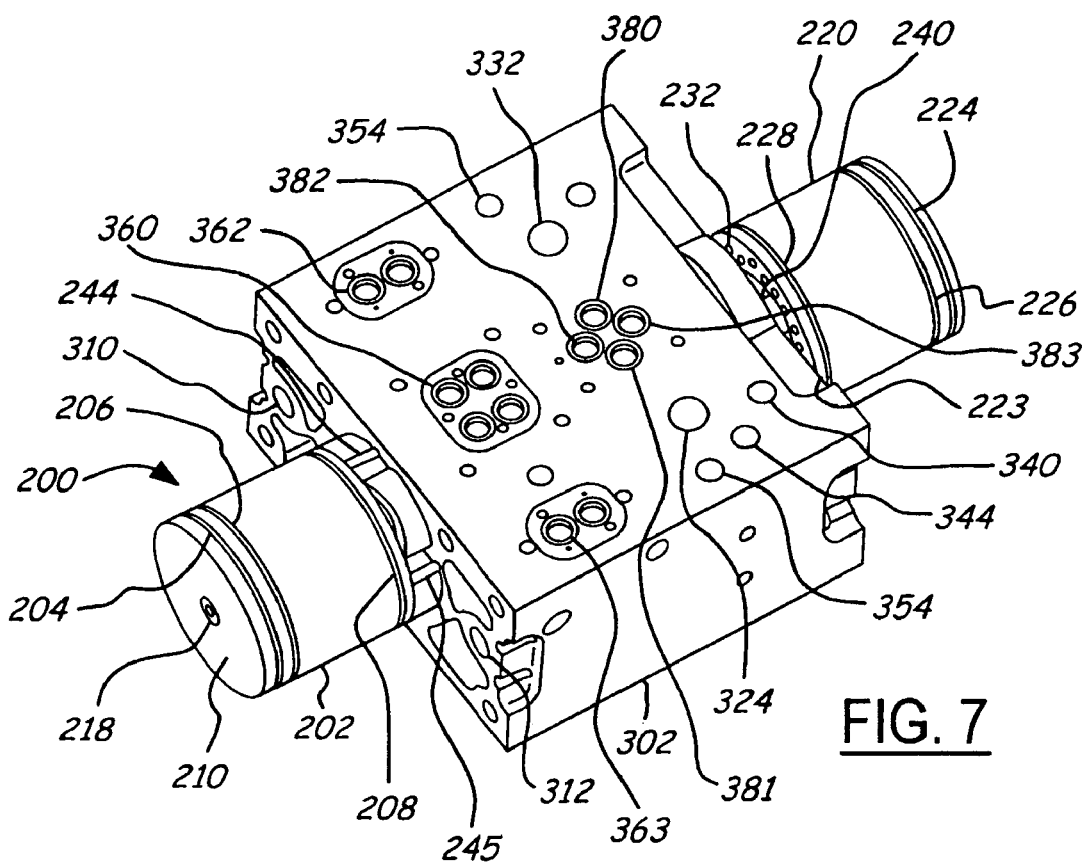
FIG. 7 is a perspective view of a portion of the engine of FIG. 1; and, more specifically, a perspective view of the top of a hydraulic pump block assembly and inner piston assembly.
Figure 8:
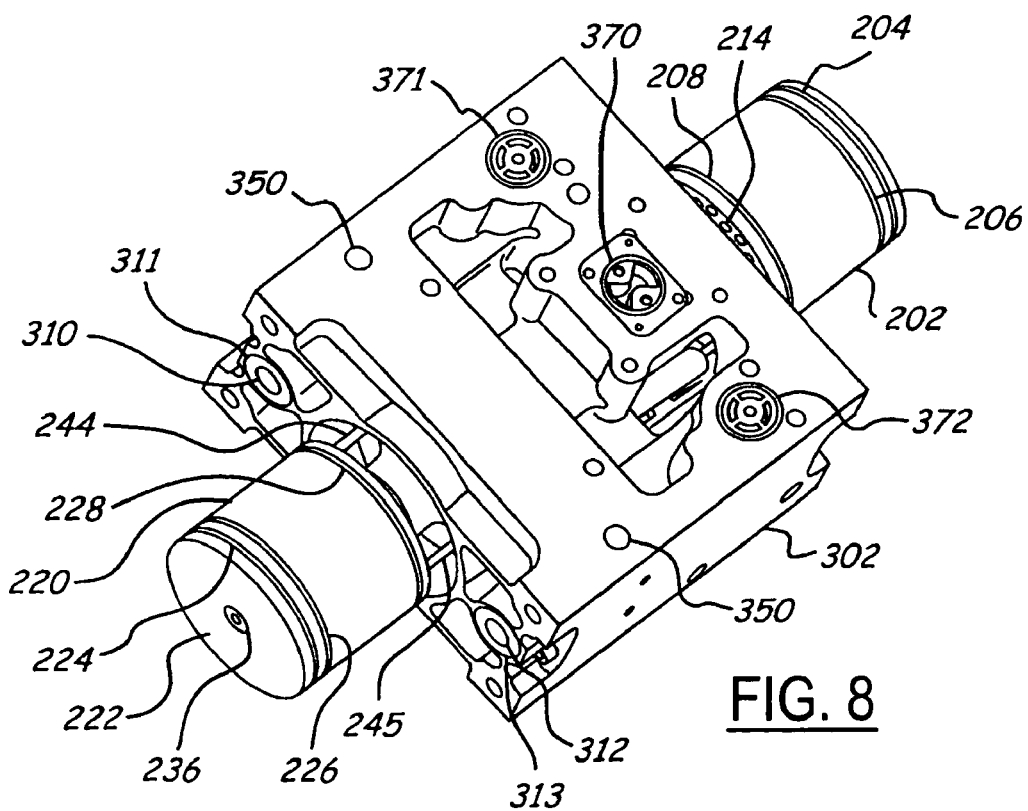
FIG. 8 is a perspective view similar to FIG. 7, but viewing the bottom of the hydraulic pump block assembly and inner piston assembly.
Figure 9:
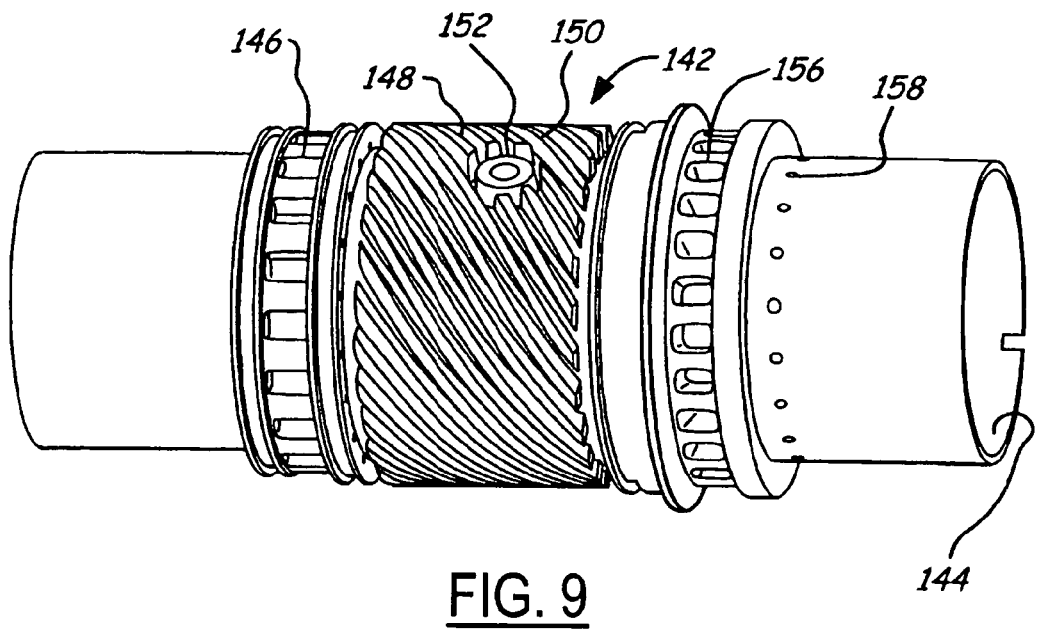
FIG. 9 is a perspective view of a cylinder liner of the engine of FIG. 1.
Figure 11:
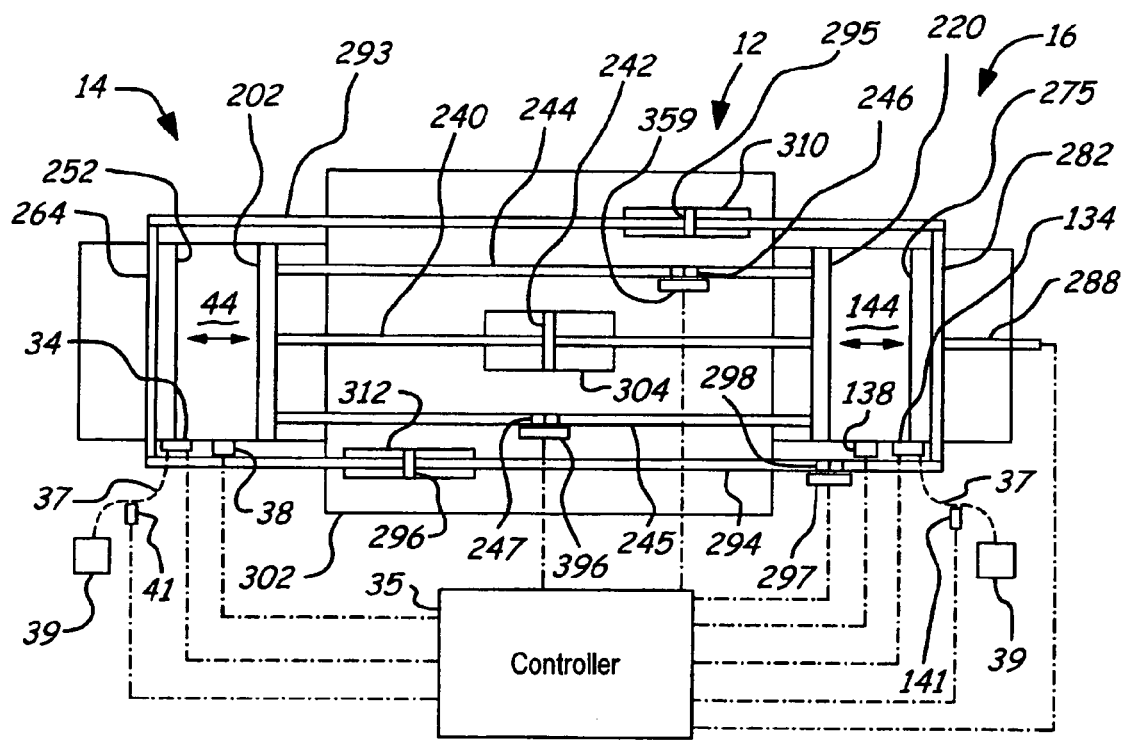
FIG. 11 is a schematic view of some of the electronic circuit employed with the engine of FIG. 1.
Figure 10:
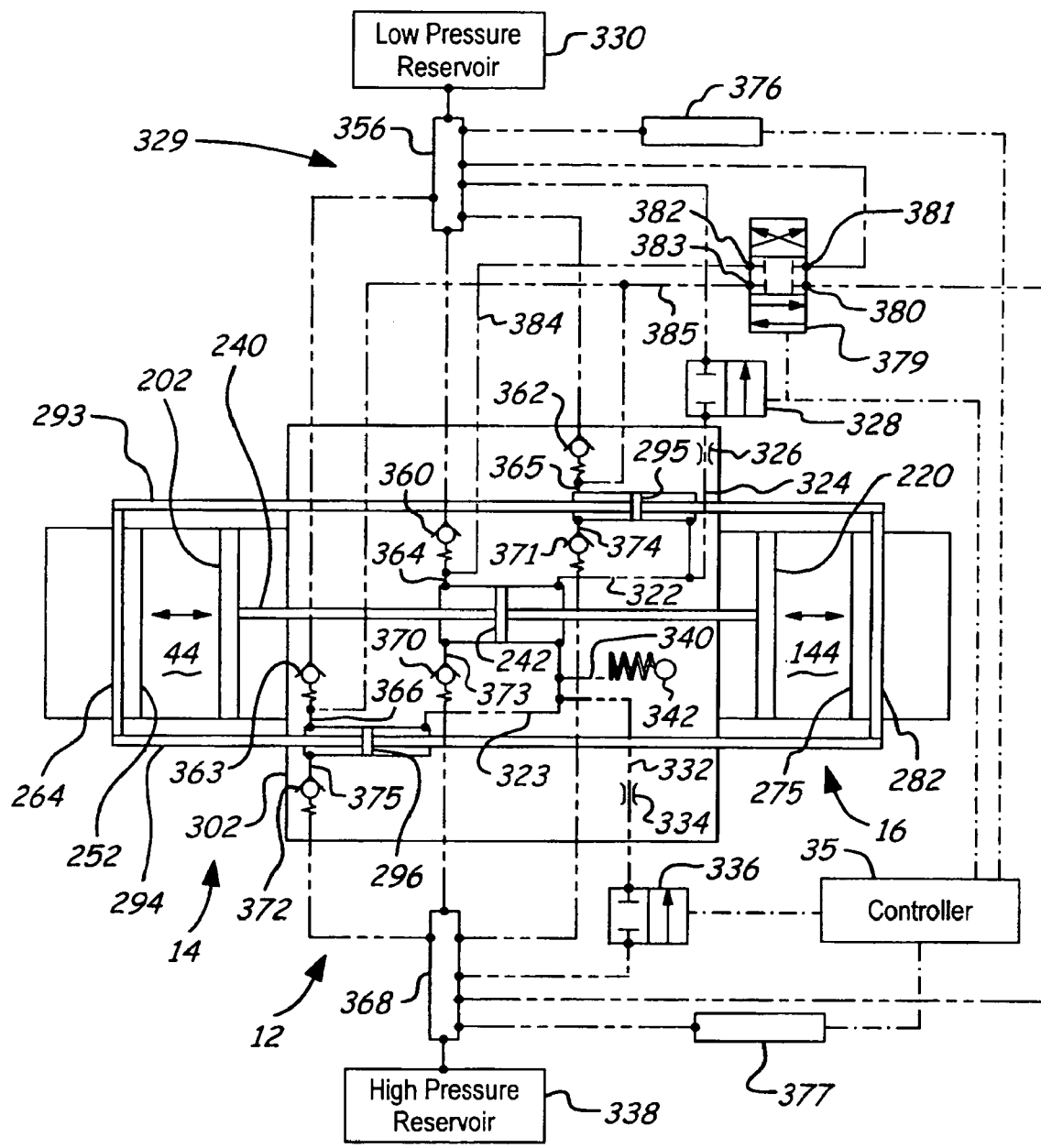
FIG. 10 is a schematic view of the hydraulic circuit of the engine of FIG. 1.
Figure 12:
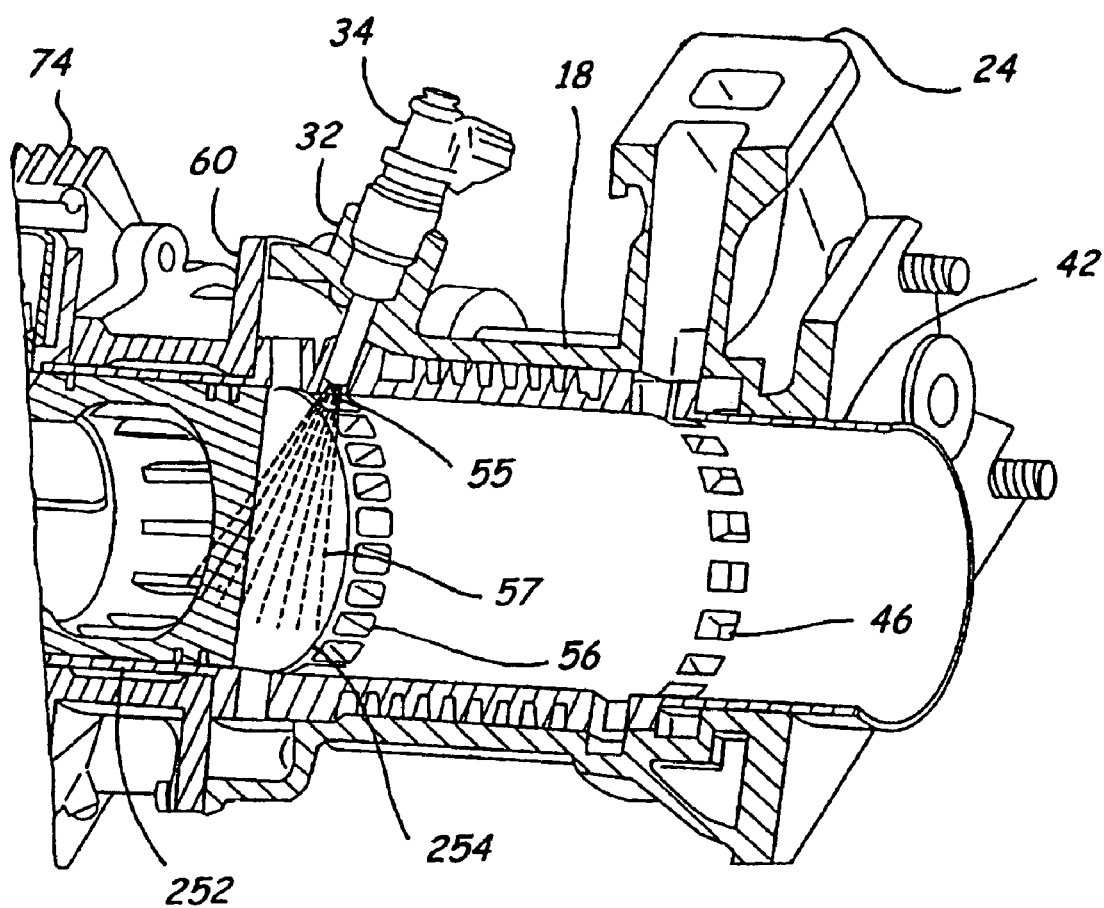
FIG. 12 is a partially sectioned perspective view of a portion of the engine of FIG. 1, illustrating fuel spray from a fuel injector into an engine cylinder.

FIGS. 1–12 illustrate an opposed piston, opposed cylinder, hydraulic, free piston engine 10. The engine 10 includes a hydraulic pump block assembly 12, with a first piston/cylinder assembly 14 extending therefrom, and a second piston/cylinder assembly 16 extending from the hydraulic pump block assembly 12 in the opposite direction so they are in line. The timing of the first piston/cylinder assembly 14 is opposite to the timing of the second piston/cylinder assembly 16. Thus, when one is at top dead center, the other is at bottom dead center. Moreover, the motion is along or parallel to a single axis of motion. This configuration of free piston engine allows for a more inherently balanced engine.

Additionally, the following description discloses an engine that not only stores energy produced by the engine in the form of pressurized fluid, but also employs some of this pressurized fluid to start and, at times, assist in controlling the engine operation and maintaining the engine balance.

The first piston/cylinder assembly 14 includes a first cylinder jacket 18, which mounts to the hydraulic pump block assembly 12. The first cylinder jacket 18 includes a first exhaust gas scroll 20, which is located adjacent to the hydraulic pump block assembly 12. The interior of the first exhaust gas scroll 20 defines an inner exhaust channel 22 that extends circumferentially around the first cylinder jacket 18 and radially outward to a first exhaust flange 24. The exhaust flange 24 is adapted to connect to an exhaust system (not shown) for carrying away the exhaust during engine operation. The exhaust system can be any type desired so long as it adequately treats and carries away the exhaust gasses. It may, for example, include an exhaust manifold, a muffler, a catalytic converter, a turbocharger, or a combination of these and possibly other components.

The first cylinder jacket 18 also has a coolant inlet 26, which is located adjacent to the hydraulic pump block assembly 12, and extends into a generally circumferentially extending coolant passage 28. The coolant inlet 26 connects to a coolant cooling system (not shown), which can include, for example, a heat exchanger, such as a radiator, for removing heat from the engine coolant, a water pump for pumping the coolant through the cooling system, a temperature sensor and flow control valve for maintaining the coolant in a desired temperature range, coolant lines extending between the components, or a combination of these and possibly other components. The cooling system can be any type of engine cooling system desired so long as it removes the appropriate amount of heat from the engine.

At the opposite end of the first cylinder jacket 18 from the exhaust gas scroll 20 is a circumferentially extending air intake annulus 30, the interior of which defines an intake channel 31. Adjacent to the air intake annulus 30, the first cylinder jacket 18 forms a fuel injector boss 32, within which a first fuel injector 34 is mounted. The first fuel injector 34 is electrically connected to an electronic controller 35, which provides a signal for determining the timing and duration of fuel injector opening. The first fuel injector 34 also connects to a fuel injector rail 37, which supplies fuel from a fuel system 39 (only shown schematically). The fuel system 39 may include, for example, a fuel tank, fuel pump, fuel lines leading to the fuel rail, or a combination of these and possibly other components. Any type of fuel system that can provide an adequate amount of fuel under the desired pressure to the fuel injector 34 is generally acceptable. Preferably, the fuel injector rail 37 also includes a fuel pressure sensor 41 that is electrically connected to the controller 35. The controller 35 is preferably powered by an electrical system with a battery (not shown), an electric generator or alternator, which is preferably powered by energy output from the engine 10, or some other adequate supply of electrical power. Also, while the controller 35 is referred to in the singular herein, it may include multiple electronic processors in communication with one another, if so desired.

About mid-way between the first exhaust gas scroll 20 and the intake annulus 30, the first cylinder jacket 18 forms a pressure sensor mounting boss 36, within which is mounted a first cylinder pressure sensor 38. The first cylinder pressure sensor 38 is preferably electrically connected to the controller 35. Both the fuel injector boss 32 and the sensor mounting boss 36 extend through the first cylinder jacket 18 to a main bore 40 that extends the length of the first cylinder jacket 18. The coolant passage 28, inner exhaust channel 22 and the air intake annulus 30 are all open into the main bore 40 as well.

The first piston/cylinder assembly 14 also includes a first cylinder liner 42, which extends through and is preferably press fit into the main bore 40 of the first cylinder jacket 18. The first cylinder liner 42 includes a cylindrical shaped main bore extending therethrough that defines the first engine cylinder 44. The central axis of the first engine cylinder is preferably along the axis of motion. The first cylinder liner 42 also includes a series of circumferentially spaced exhaust ports 46, which extend between and connect the first engine cylinder 44 and the inner exhaust channel 22 of the first cylinder jacket 18.

Adjacent to the exhaust ports 46, the first cylinder liner 42 abuts the coolant passage 28 in the first cylinder jacket 18. This coolant passage 28 connects to a series of spaced, helical ribs 48 that extend radially outward from the first cylinder liner 42 and abut the main bore 40 of the first cylinder jacket 18, forming a series of cylinder coolant passages 50. Within these ribs 48, a cylinder pressure tap boss 52 extends from the first engine cylinder 44 to the sensor mounting boss 36 on the first cylinder jacket 18. This allows the first cylinder pressure sensor 38 to be exposed to the first engine cylinder 44, while sealing the sensor 38 from the engine coolant.

A fuel injector bore 54 aligns with the fuel injector boss 32 and extends through the ribs 48 to the first engine cylinder 44. This allows a nozzle 55 of the first fuel injector 34 to be exposed to and inject fuel 57 (shown schematically in FIG. 12) directly into the first engine cylinder 44.

The first cylinder liner 42 also has a series of circumferentially spaced air intake ports 56, aligned with the air intake annulus 30 of the first cylinder jacket 18, and opening into the first cylinder 44. The air intake ports 56 are preferably adjacent to the fuel injector bore 54 and spaced farther from the exhaust ports 46 than the fuel injector bore 54. The fuel injector bore 54 is preferably angled so that the nozzle 55 will spray the fuel 57 in the general direction of the air intake ports 56. Also adjacent to the air intake ports 56, is a series of spaced oil mist holes 58 located circumferentially around the first cylinder liner 42.

The first piston/cylinder assembly 14 includes a first air belt 60. The air belt 60 is mounted about the first cylinder liner 42, abutting the first cylinder jacket 18 at the location of the air intake annulus 30. An oil inlet tube 62 projects from and extends through the first air belt 60, connecting to an oil mist annulus 64. The oil mist annulus 64 abuts and extends circumferentially around the first cylinder liner 42 at the location of the oil mist holes 58. The oil inlet tube 62 preferably connects to an oil mister (not shown), which has an inlet connected to a source of oil, and provides a mixture of oil and air to the oil mist annulus 64. The source of oil may be a part of an oil supply system (not shown). The oil supply system may include, for example, an oil pump, an oil filter, an oil cooler, an oil sump, oil lines to transfer the oil through the system, or a combination of these and possibly other components. The oil supply system can be any such system that can cooperate with the engine components to adequately filter and supply lubrication oil to the engine while it is operating.

Also abutting and extending circumferentially around the first cylinder liner 42 is a coolant annulus 66. The coolant annulus 66 connects to the cylinder coolant passages 50 and also to a coolant outlet 68 extending from the first air belt 60. This coolant outlet 68 connects to the coolant cooling system (not shown), which was discussed above. The first air belt 60 also has a pair of pull rod passages 70 and an intake air passage 72 that are in communication with the air intake annulus 30 of the first cylinder jacket 18.

The first piston/cylinder assembly 14 also incorporates a first scavenge pump 74. The scavenge pump 74 includes a scavenge pump housing 76 that mounts to the first air belt 60, and around the end of the first cylinder liner 42. The scavenge pump housing 76 has a main pumping chamber 78, with inlet ports 80 leading to an inlet chamber 82 and outlet ports 84 leading to an outlet chamber 86. The main pumping chamber 78 is cylindrical in shape, with a generally elliptical cross section.

Mounted to the inlet chamber 82 is an inlet reed valve assembly 88 and a scavenge pump inlet cover 90. The inlet cover 90 includes an air inlet 92, which preferably connects to an air intake system (not shown). The air intake system may include, for example, an intake manifold that preferably receives air from some type of a turbocharger or mechanical supercharger, an air throttling valve, a mass air flow sensor, an ambient air temperature sensor, an air filter, or a combination of these and possibly other components. The air intake system may be any such system that supplies a desired volume of air at a desired pressure to the air inlet 92 for the particular engine operating conditions.

Reed valves 94 in the inlet reed valve assembly 88 are oriented to allow air flow into the inlet chamber 82 from the inlet cover 90, but prevent air flow in the opposite direction. An outlet reed valve assembly 89 and scavenge pump outlet cover 91 are mounted to the outlet chamber 86. The outlet cover 91 includes an air intake passage 93 that leads from the outlet reed valve assembly 89 to the air intake channel 31 of the first cylinder jacket 18 via the intake air passage 72 in the first air belt 60. Reed valves 95 in the outlet reed valve assembly 89 are oriented to allow airflow out of the outlet chamber 86 to the air intake passage 93, but prevent airflow in the opposite direction.

The second piston/cylinder assembly 114 includes a second cylinder jacket 118, which mounts to the hydraulic pump block assembly 12. The second cylinder jacket 118 includes a second exhaust gas scroll 120 that is located adjacent to the hydraulic pump block assembly 12. The interior of the second exhaust gas scroll 120 defines an inner exhaust channel 122 that extends circumferentially around the second cylinder jacket 118 and radially outward to a second exhaust flange 124. The exhaust flange 124 is adapted to connect to the exhaust system (not shown), discussed briefly above. The second cylinder jacket 118 also has a coolant inlet 126, which is located adjacent to the hydraulic pump block assembly 12, and extends into a generally circumferentially extending coolant passage 128. The coolant inlet 126 connects to the coolant cooling system (not shown).

At the opposite end of the second cylinder jacket 118 from the exhaust gas scroll 120 is a circumferentially extending air intake annulus 130, the interior of which defines an intake channel 131. Adjacent to the air intake annulus 130, the second cylinder jacket 118 forms a fuel injector boss 132, within which a second fuel injector 134 is mounted. The second fuel injector 134 is electrically connected to the electronic controller 35, which provides a signal for controlling the timing and duration of fuel injector opening. The second fuel injector 134 also connects to the fuel injector rail 37, which supplies fuel from the fuel system 39. The fuel system 39 may include, for example, a fuel tank, fuel pump and fuel lines leading to the fuel rail. Preferably, the fuel injector rail 37 also includes a fuel pressure sensor 141 that is electrically connected to the controller 35.

About mid-way between the second exhaust gas scroll 120 and the intake annulus 130, the second cylinder jacket 118 forms a pressure sensor mounting boss 136, within which is mounted a second cylinder pressure sensor 138. Both the fuel injector boss 132 and the sensor mounting boss 136 extend through the second cylinder jacket 118 to a main bore 140 that extends the length of the second cylinder jacket 118. The coolant passage 128, inner exhaust channel 122 and the air intake annulus 130 are all open into the main bore 140 as well.

The second piston/cylinder assembly 114 also includes a second cylinder liner 142, which extends through and is preferably press fit in main bore 140 of the second cylinder jacket 118. The second cylinder liner 142 includes a cylindrical shaped main bore extending therethrough that defines the second engine cylinder 144. The central axis of the second engine cylinder 144 is preferably along the axis of motion. The second cylinder liner 142 also includes a series of circumferentially spaced exhaust ports 146, which extend between and connect the second engine cylinder 144 and the inner exhaust channel 122 of the second cylinder jacket 18.

Adjacent to the exhaust ports 146, the second cylinder liner 142 abuts the coolant passage 128 in the second cylinder jacket 118. This coolant passage 128 connects to a series of spaced, helical ribs 148 that extend from the second cylinder liner 142 and abut the main bore 140 of the second cylinder jacket 118 to form a series of cylinder coolant passages 150. Within these ribs 148, a cylinder pressure tap boss 152 extends from the second engine cylinder 144 to the sensor mounting boss 136 on the second cylinder jacket 118. This allows the second cylinder pressure sensor 138 to be exposed to the second engine cylinder 144, while sealing the sensor 138 from the engine coolant.

A fuel injector bore aligns with the fuel injector boss 132 and extends through the ribs 148 to the second engine cylinder 144. This allows the second fuel injector 134 to extend through to the second engine cylinder 144 and directly inject fuel therein.

The second cylinder liner 142 also has a series of circumferentially spaced air intake ports 156, aligned with the air intake annulus 130 of the second cylinder jacket 118 and opening into the second engine cylinder 144. In the same way as with the first engine cylinder, the air intake ports 156 are adjacent to the fuel injector bore, with the fuel injector 134 angled so that the fuel is sprayed in the general direction of the air intake ports 56. Also adjacent to the air intake ports 156, is a series of spaced oil mist holes 158, which are located circumferentially around the second cylinder liner 142.

The second piston/cylinder assembly 114 also includes a second air belt 160. The air belt 160 is mounted about the second cylinder liner 142, abutting the second cylinder jacket 118 at the location of the air intake annulus 130. An oil inlet tube 162 projects from and extends through the second air belt 160, connecting to an oil mist annulus 164. The oil mist annulus 164 abuts and extends circumferentially around the second cylinder liner 142 at the location of the oil mist holes 158. The oil inlet tube 162 preferably connects to the oil mister (not shown), in order to provide an oil and air mixture to the oil mist annulus 164.

Also abutting and extending circumferentially around the second cylinder liner 142 is a coolant annulus 166. The coolant annulus 166 connects to the cylinder coolant passages 150 and also to a coolant outlet 168 extending from the second air belt 160. This coolant outlet 168 connects to the coolant cooling system (not shown), discussed above. The second air belt 160 also has a pair of pull rod passages 170 and an intake air passage 172 that are in communication with the air intake annulus 130 of the second cylinder jacket 118.

The second piston/cylinder assembly 114 also incorporates a second scavenge pump 174. The scavenge pump 174 includes a scavenge pump housing 176 that mounts to the second air belt 160 and around the end of the second cylinder liner 142. The scavenge pump housing 176 has a main pumping chamber 178, with inlet ports 180 leading to an inlet chamber 182 and outlet ports 184 leading to an outlet chamber 186. The main pumping chamber 178 is cylindrical in shape, with a generally elliptical cross section. Mounted to the inlet chamber 182 is an inlet reed valve assembly 188 and a scavenge pump inlet cover 190. The inlet cover 190 includes an air inlet 192, which preferably connects to the inlet manifold (not shown) that preferably receives air from some type of a supercharger or turbocharger (not shown). Reed valves 194 in the inlet reed valve assembly 188 are oriented to allow air flow into the inlet chamber 182 from the inlet cover 190, but prevent air flow in the opposite direction.

An outlet reed valve assembly 189 and scavenge pump outlet cover 191 are mounted to the outlet chamber 186. The outlet cover 191 includes an air intake passage 193 that leads from the outlet reed valve assembly 189 to the air intake channel 131 of the second cylinder jacket 118 via the intake air passage 172 in the second air belt 160. Reed valves 195 in the outlet reed valve assembly 189 are oriented to allow air flow out of the outlet chamber 186 to the air intake passage 193, but prevent air flow in the opposite direction.

Contained within the two piston/cylinder assemblies 14 and 16 are two piston assemblies—an inner piston assembly 200 and an outer piston assembly 250. The inner piston assembly 200 has a first inner piston 202 that is mounted within the first engine cylinder 44, with the head 210 of the first inner piston 202 facing away from the hydraulic pump block assembly 12, and the rear 211 facing toward the hydraulic pump block assembly 12. The first inner piston 202 mounts within the first engine cylinder 44 with a small clearance between its outer diameter and the wall of the first engine cylinder 44. Accordingly, the first inner piston 202 also preferably includes three ring grooves about its periphery, with the first groove receiving a first compression ring 204, the second receiving a second compression ring 206 and the third receiving an oil control ring 208. All three of the rings 204, 206, and 208 are sized to seal against the wall of the first engine cylinder 44.

The first inner piston 202 also preferably includes a series of generally axially extending bores 212—extending from the rear 211 of the piston 202 toward the head 210. Each bore 212 is preferably partially filled with a sodium compound and has a cap 214 for sealing the sodium compound in the bore 212.

The inner piston assembly 200 further includes a second inner piston 220 that is mounted within the second engine cylinder 144, with the head 222 of the second inner piston 220 facing away from the hydraulic pump block assembly 12 and the rear 223 facing toward the hydraulic pump block assembly 12. The second inner piston 220 mounts within the second engine cylinder 144 with a small clearance between its outer diameter and the wall of the second engine cylinder 144. Accordingly, the second inner piston 220 also preferably includes three ring grooves about its periphery, with the first groove receiving a first compression ring 224, the second receiving a second compression ring 226 and the third receiving an oil control ring 228. All three of the rings 224, 226, and 228 are sized to press and seal against the wall of the second engine cylinder 144.

The second inner piston 220 also preferably includes a series of generally axially extending bores 230—extending from the rear 223 of the inner piston 220 toward the head 222. Each bore 230 is preferably partially filled with a sodium compound and has a cap 232 for sealing the sodium compound in the bore 230.

The first inner piston 202 includes a centrally located, axially extending bore 216 therethrough that receives a fastener 218, and the second inner piston 220 also includes a centrally located, axially extending bore 234 therethrough that receives a fastener 236. The fasteners 218 and 236 are each threaded to respective ends of a push rod 240, which extends through the hydraulic pump block assembly 12. The push rod 240, being fixed to each inner piston 202 and 220, causes the two pistons 202 and 220 to move in unison, preferably along the axis of motion. The push rod 240 also includes an enlarged diameter region, which forms an inner plunger 242. The inner plunger 242 is located midway between the two pistons 202 and 220. The purpose of the inner plunger 242 will be discussed below with reference to the hydraulic pump block assembly 12.

The inner piston assembly 200 also preferably includes a first guide rod 244 and a second guide rod 245, with each extending through the hydraulic pump block assembly 12 to connect between the rear faces 211 and 223 of the first and second inner pistons 202 and 220. The guide rods 244 and 245 keep the inner piston assembly 200 from rotating during engine operation. Also, preferably, at least one, and more preferably, both of the guide rods 244 and 245 include position sensor indices that can be employed to determine the axial position of the inner piston assembly 200 during engine operation. Such indices may take the form of a first set of copper rings 246 fixed around the first guide rod 244. The second guide rod 245 also preferably includes indices, such as a second set of cooper rings 247. The second guide rod 245 can then be employed as part of a position calibration sensor for assuring that the position sensor on the first guide rod 244 is reading the axial position of the inner piston assembly 200 accurately.

The outer piston assembly 250 has a first outer piston 252 that is mounted within the first engine cylinder 44, with the head 254 of the first outer piston 252 facing toward the head 210 of the first inner piston 202, and the rear 256 facing toward the first scavenge pump main chamber 78. The first outer piston 252 mounts within the first engine cylinder 44 with a small clearance between its outer diameter and the wall of the first engine cylinder 44. Accordingly, the first outer piston 252 also preferably includes three ring grooves about its periphery, with the first groove receiving a first compression ring 258, the second receiving a second compression ring 260 and the third receiving an oil control ring 262. All three of the rings 258, 260, and 262 are sized to seal against the wall of the first engine cylinder 44.

Mounted on the rear 256 of the first outer piston 252 is a first piston bridge 264. The first piston bridge 264 moves with and essentially forms a portion of the first outer piston 252. The first piston bridge 264 includes an outer, generally elliptical shaped portion 266 that is in sliding contact with and seals against the wall of the main pumping chamber 78 of the first scavenge pump 74. The minor diameter of the elliptical portion 266 is preferably slightly smaller than the diameter of the head 254 of the first outer piston 252, while the major diameter of the elliptical portion 266 is significantly larger than the diameter of the head 254. A first pull rod boss 268 and a second pull rod boss 269 are located along the major diameter of the elliptical portion 266, radially outward of the outer diameter of the first outer piston 252.

A guide post boss 270 is located in the center of the first piston bridge 264, centered on the axis of motion for the first outer piston 252. A first guide post 271 is fixed to and extends from the first scavenge pump housing 76. The first guide post 271 has a generally cylindrical outer surface that is centered about an extends parallel to the axis of motion. This outer surface just slips within the guide post boss 270 in order to allow the guide post boss 270 to telescopically slide along the first guide post 271. Since the first guide post 271 is fixed, its position can be located accurately relative to the first engine cylinder 44. The first guide post 271, then, will allow for very accurate orientation of the first piston bridge 264 and hence the first outer piston 252 relative to the first engine cylinder 44.

The guide post boss 270, then, will slide on the guide post 271 during engine operation, maintaining proper orientation of the first outer piston 252 as it reciprocates in the first engine cylinder 44 so the only the piston rings 258, 260 and 262 are in contact with the wall of the first engine cylinder 44. This generates only a relatively small amount of friction since generally only the piston rings 258, 260, and 262 and guide post boss 270 are in sliding contact with other surfaces, while the outer surface of the first outer piston 252 moves without being in contact with the wall of the first engine cylinder 44.

The outer piston assembly 250 also has a second outer piston 275 that is mounted within the second engine cylinder 144, with the head 276 of the second outer piston 275 facing toward the head 222 of the second inner piston 220, and the rear 277 facing toward the second scavenge pump main chamber 178. The second outer piston 275 mounts within the second engine cylinder 144 with a small clearance between its outer diameter and the wall of the second engine cylinder 144. Accordingly, the second outer piston 275 also preferably includes three ring grooves about its periphery, with the first groove receiving a first compression ring 278, the second receiving a second compression ring 279 and the third receiving an oil control ring 280. All three of the rings 278, 279, and 280 are sized to seal against the wall of the second engine cylinder 144.

Mounted on the rear 277 of the second outer piston 275 is a second piston bridge 282. The second piston bridge 282 includes an outer, generally elliptical shaped portion 283 that is in sliding contact with and seals against the wall of the main pumping chamber 178 of the second scavenge pump 174. The minor diameter of the elliptical portion 283 is preferably slightly smaller than the diameter of the head 276 of the second outer piston 275, while the major diameter of the elliptical portion 283 is significantly larger than the diameter of the head 276. A first pull rod boss 284 and a second pull rod boss 285 are located along the major diameter of the elliptical portion 283, radially outward of the outer diameter of the second outer piston 275.

A guide post boss 286 is located in the center of the second piston bridge 282. A second guide post 287 is fixed to and extends from the second scavenge pump housing 176. The second guide post 287 has a generally cylindrical outer surface that is centered about and extends parallel to the axis of motion. The outer surface slips within the guide post boss 286. With the second guide post 287 being fixed relative to the second engine cylinder 144, it will accurately align the second piston bridge 282 and hence the second outer piston 275 relative to the second engine cylinder 144. The guide post boss 286, then, will slide on the guide post 287 during engine operation, maintaining proper orientation of the second outer piston 275 as it reciprocates in the second engine cylinder 144, so that the piston rings 278, 279 and 280 are in contact with the wall of the second engine cylinder 144. Again, the friction will be minimized, while also allowing for proper guiding of the engine piston.

The second guide post 287 also forms part of a position sensor assembly 288. The position sensor assembly 288 includes a sensor rod 289, which has at least one index location 290, affixed to and slidable with the second outer piston 275. A sensor 291 mounts about the sensor rod 289 and extends through the second scavenge pump housing 176, where an electrical connector 292 will connect the sensor 291 to the electronic controller 35. The controller 35 can use the output from the sensor 291 to determine the position and velocity of the outer piston assembly 250.

The outer piston assembly 250 also includes a first pull rod 293 and a second pull rod 294. The first pull rod 293 connects between the first pull rod boss 268 on the first piston bridge 264 and the first pull rod boss 284 on the second piston bridge 282. Since the bridges 264 and 282 are elliptical, the first pull rod 293 can couple them together and allow for movement parallel to the axis of motion without interfering with the operation of the engine cylinders.

The first pull rod 293 includes an enlarged diameter region, which forms a first outer plunger 295. The first outer plunger 295 is located in the hydraulic pump block assembly 12 mid-way between the first piston-bridge 264 and the second piston-bridge 282. A first pull rod sleeve 272 extends about the first pull rod 293 between the hydraulic pump block assembly 12 and the first cylinder jacket 18, and a second pull rod sleeve 273 extends about the first pull rod 293 between the hydraulic pump block assembly 12 and the second cylinder jacket 118. The pull rod sleeves 272 and 273 assure that the first pull rod 293 is entirely enclosed by engine components, thus preventing contaminants from contacting and interfering with the operation of the first pull rod 293.

The second pull rod 294 connects between the second pull rod boss 269 on the first piston bridge 264 and the second pull rod boss 285 on the second piston bridge 282. The second pull rod 294 includes an enlarged diameter region, which forms a second outer plunger 296. The second outer plunger 296 is located in the hydraulic pump block assembly 12 mid-way between the first piston-bridge 264 and the second piston-bridge 282. A third pull rod sleeve 274 extends about the second pull rod 294 between the hydraulic pump block assembly 12 and the first cylinder jacket 18, and preferably a position sensing pull rod sleeve 281 extends about the second pull rod 294 between the hydraulic pump block assembly 12 and the second cylinder jacket 118. The pull rod sleeves 274 and 281 assure that the second pull rod 294 is entirely enclosed by engine components, thus preventing contaminants from contacting and interfering with the operation of the second pull rod 294.

Additionally, the second pull rod 294 preferably includes spaced copper rings 298 mounted thereon and located within the position sensing pull rod sleeve 281. The position sensing pull rod sleeve 281 preferably includes a sensor assembly 297 located in close proximity to the copper rings 298. The sensor assembly 297 is then connected to the controller 35, and will detect the position of the copper rings 298. The controller 35 can then use the output from the sensor assembly 29 to calibrate the other sensor 291, thus assuring an accurate measurement of the position and velocity of the outer piston assembly 250.

It is preferable for the engine 10 to be balanced in order to assure optimal operating characteristics. For the engine to be balanced, the total mass of the outer piston assembly 250—that is, all of the parts that move with the outer pistons 252 and 275—must equal the total mass of the inner piston assembly 200—that is, all of the parts that move with the inner pistons 202 and 220. Also, preferably, for a balanced engine, the hydraulic area of the inner plunger 242 of the push rod 240 is equal to the sum of the hydraulic areas of the outer plungers 295 and 296 of the pull rods 292 and 294—with the hydraulic area of the first outer plunger 295 being equal to the hydraulic area of the second outer plunger 296. Accordingly, the materials for the different components in the piston assemblies 200 and 250 are chosen to assure adequate thermal and strength characteristics while also balancing the masses of the assemblies. For example, the inner pistons 202 and 220, and the push rod 240 may be made of cast iron, the pull rods 293 and 294 also made of cast iron, while the outer pistons 252 and 275 are made of aluminum and the elliptical shaped bridges 264 and 282 are made of steel. Although, other suitable materials may be employed, if desired.

As discussed above, the hydraulic pump block assembly 12 mounts between the first piston/cylinder assembly 14 and the second piston/cylinder assembly 16. It includes a pump block 302, preferably made of steel, through which various hydraulic porting and passages, coolant passages and lubrication oil sump and passages are formed.

The pump block 302 includes a push rod bore 304 through which the push rod 240 extends. The inner plunger 242 seals circumferentially around the push rod bore 304. Both ends of the central bore 304 also seal against the push rod 240—one end employing a seal plug 309 to create the seal. These seals form an inner pumping chamber 306 on one side of the inner plunger 242 and an inner coupler-pumping chamber 308 on the other side of the inner plunger 242.

The pump block 302 also includes a first pull rod bore 310 through which the first pull rod 293 extends, and a second pull rod bore 312 through which the second pull rod 294 extends. The first outer plunger 295 seals circumferentially around the first pull rod bore 310 and the second outer plunger 296 seals circumferentially around the second pull rod bore 312. The first pull rod bore 310 is shaped to seal, at each end, against the first pull rod 293, with a seal plug 311 again employed at one end for sealing. The pull rod bore 310, in conjunction with the first pull rod 293, forms a first outer pumping chamber 314 on one side of the first outer plunger 295, and a first outer coupler pumping chamber 316 on the other side of the first outer plunger 295. The second pull rod bore 312 is shaped to seal, at each end, against the second pull rod 294, with a seal plug 313 again employed at one end for sealing. The second pull rod bore 312, in conjunction with the second pull rod 294, forms a second outer pumping chamber 318 on one side of the second outer plunger 296, and a second outer coupler pumping chamber 320 on the other side of the second outer plunger 296.

The inner coupler-pumping chamber 308 and the first outer coupler pumping chambers 316 are connected with a first cross connecting passage 322. In addition, the inner coupler pumping chamber 308 and the second outer coupler pumping chamber 320 are connected with a second cross connecting passage 323. Consequently, the three-coupler pumping chambers 308, 316 and 320 are always in open fluid communication with each other.

A low-pressure passage 324, with a restriction 326, leads from the second cross connecting passage 323 to a first coupler adjustment valve 328. The first coupler adjustment valve 328 is connected to the low-pressure reservoir 330 side of the hydraulic system 329. It can be switched between a position that allows fluid flow from the second cross connecting passage 323 to the low pressure reservoir 330, and a position that blocks such fluid flow. A high-pressure passage 332, with a restriction 334, leads from the first cross connecting passage 322 to a second coupler adjustment valve 336. The second coupler adjustment valve 336 is connected to the high-pressure reservoir 338 side of the hydraulic system 329. It can be switched between a position that allows fluid flow from the high pressure reservoir 338 to the first cross connecting passage 322, and a position that blocks such fluid flow. The first and second coupler adjustment valves 328 and 336 are electrically connected to and operated by the electronic controller 35.

A resonator passage 340 extends between the second cross connecting passage 323 and a Helmholtz resonator 342, which is mounted on the pump block 302. The Helmholtz resonator 342 is tuned to damp pulsations that occur as the fluid flows back and forth between the coupler pumping chambers 308, 316 and 320 through the cross connecting passages 322 and 323. The Helmholtz resonator 342 may be eliminated from the engine 10, if so desired.

These cross connecting passages 322 and 323, together with the hydraulic components connected to them, form a hydraulic circuit that hydraulically couples the movement of the inner piston assembly 200 with the outer piston assembly 250. Since, with the coupler adjustment valves 328 and 336 closed, the volume in the coupler pumping chambers 308, 316 and 320, and the cross connecting passages 322 and 323, is filled with an essentially incompressible liquid (such as hydraulic oil), this volume will remain constant. Also, as noted above, the inner plunger 242 of the push rod 240 is sized to displace twice the volume of fluid (per amount of linear movement) as each of the outer plungers 295 and 296 of the pull rods 293 and 294, respectively. Consequently, if the inner piston assembly 200 moves one millimeter to the right, displacing fluid out of the inner coupler pumping chamber 308, then the outer piston assembly 250 must move one millimeter to the left, in order to receive that amount of fluid in the two outer coupler pumping chambers 316 and 320. This assures that, even though the motions of the inner piston assembly 200 and the outer piston assembly 250 are not mechanically fixed, they will move in virtually exact opposition to each other. Consequently, the top dead center and bottom dead center positions for the two piston assemblies 200 and 250 are reached simultaneously.

The first and second coupler adjustment valves 328 and 336 allow for the addition or removal of some of the fluid from the couplers should leakage around any seals change the volume of the fluid retained in the couplers. While this hydraulic system for coupling the piston assemblies 200 and 250 has been described, other mechanisms for assuring that the piston assemblies 200 and 250 move opposed to one another may be employed if so desired.

The hydraulic pump block assembly 12 also includes a pair of oil inlets 344 and 345 that extend through the pump block 302 to an oil sump 346 located on the underside of the pump block 302. The oil sump 346 is open to various moving components in the pump block assembly 12 in order to allow for splash lubrication of the moving components—particularly the portion of the cylinder walls 44 and 144 along which the first and second inner pistons 202 and 220 slide. The oil sump 346 also includes an oil return outlet 348. The oil inlets 344 and 345, and the oil return outlet 348 are connected to the oil supply system (not shown). The oil sump 346 also allows for air to move back and forth behind the inner pistons 202 and 220 as they reciprocate during engine operation.

Two coolant inlets 350 are mounted on the bottom of the pump block 302. The coolant inlets 350 connect to a series of coolant passages 352 that extend throughout the pump block 302, which then connect to two coolant outlets 354 mounted on the top of the pump block 302. The coolant inlets 350 and the coolant outlets 354 connect to the coolant cooling system (not shown). The coolant flowing through the pump block 302 will assure that the moving parts do not overheat during engine operation.

The hydraulic pump block assembly 12 also includes a low pressure rail 356, mounted on top of the pump block 302, that includes a low pressure rail port 358 connected through a hydraulic line to the low pressure reservoir 330. The low pressure rail 356 opens to three sets of one-way low pressure check valves, an inner set 360, a first outer set 362 and a second outer set 363. The inner set of check valves 360 connects through a passage 364 to the inner pumping chamber 306, with the valve set 360 only allowing fluid flow from the low pressure rail 356 to the inner pumping chamber 306. The first outer set of check valves 362 connects through a passage 365 to the first outer pumping chamber 314, with the valve set 362 only allowing fluid flow from the low pressure rail 356 to the first outer pumping chamber 314. The second outer set of check vales 363 likewise connects through a passage 366 to the second outer pumping chamber 318, with the valve set 363 only allowing fluid flow from the low pressure rail 356 to the second outer pumping chamber 318. While the inner set of check valves 360 includes four individual valves and each of the outer sets of check valves 362 and 363 includes two valves, different numbers of individual valves can be employed, if so desired. But preferably, the inner set 360 provides for twice the valve open area as each of the outer sets 362 and 363 since the inner plunger 242 has twice the pumping capacity as either of the outer plungers 295 and 296.

A high pressure rail 368 mounts to the bottom of the pump block 302 and includes a high pressure rail port 369 connected through a hydraulic line to the high pressure reservoir 338. The high pressure rail 368 opens to three one-way high pressure check valves, an inner check valve 370, a first outer check valve 371 and a second outer check valve 372. The inner check valve 370 connects to the inner pumping chamber 306 via a fluid passage 373, with the check valve 370 only allowing fluid flow from the inner pumping chamber 306 to the high pressure rail 368. The first outer check valve 371 connects to the first outer pumping chamber 314 via a fluid passage 374, with the check valve 371 only allowing fluid flow from the first outer pumping chamber 314 to the high pressure rail 368. The second outer check valve 372 connects to the second outer pumping chamber 318 via a fluid passage 375, with the check valve 372 only allowing fluid to flow from the second outer pumping chamber 318 to the high pressure rail 368. Again, the inner check valve 370 preferably has twice the opening area as each of the outer check valves 371 and 372.

The low pressure rail 356 preferably includes a pressure sensor 376 mounted therein for measuring the pressure of the fluid in the low-pressure rail 356. The high-pressure rail 368 likewise preferably includes a pressure sensor 377 mounted therein for measuring the pressure of the fluid in the high-pressure rail 368. Both of the pressure sensors 376 and 377 are electrically connected to the electronic controller 35, for receiving and processing the pressure signals.

Mounted on top of the pump block 302, adjacent to the low-pressure rail 356, is a hydraulic starting and control valve 379. This hydraulic starting and control valve 379 is only shown schematically herein, but is preferably a hydraulic valve such as, for example, a Moog hydraulic control valve part number 35-196-4000-I-4PC-2-VIT, made by Moog Inc. of East Aurora, N.Y. The control valve 379 engages four ports on the pump block 302, a high pressure port 380, a low pressure port 381, an inner pumping chamber port 382 and an outer pumping chamber port 383. The high-pressure port 380 is connected through a fluid passage to the high-pressure rail 368, and the low-pressure port 381 is connected through a fluid passage to the low pressure rail 356. The inner pumping chamber port 382 connects through a first starting/spilling fluid passage 384 to the inner pumping chamber 306, while the outer pumping chamber port 383 connects through a second starting/spilling fluid passage 385 to the two outer pumping chambers 314 and 318.

The control valve 379 can operate to hydraulically connect the high pressure port 380 with the inner pumping chamber port 382, while at the same time connecting the low pressure port 381 with the outer pumping chamber port 383. The control valve 379 can also operate to hydraulically connect the low pressure port 381 with the inner pumping chamber port 382, while at the same time connecting the high pressure port 380 with the outer pumping chamber port 383. Under a third operating condition, the control valve 379 will block the flow of hydraulic fluid between the high and low pressure ports 380 and 381 and both the inner and the outer pumping chamber ports 382 and 383. The electronic controller 35 preferably controls which operating state the control valve 379 is in.

The hydraulic pump block assembly 12 may also include piston stoppers, which set a maximum distance at each end of travel for the pistons. These stops may be needed due to the fact that the piston motion is determined by a balance of the forces—rather than a fixed mechanical path—for a free piston engine. Piston stops for the inner piston assembly 200 preferably include radially stepped portions 388 spaced on either side of the inner plunger 242 of the push rod 240, with matching stops 389 located at each end of the central bore 304—on the pump block 302 and the seal plug 309. The relative position of the stepped portions 388 to the stops 389 will determine the maximum travel of the inner piston assembly 200 in either direction. If the stepped portions 388 engage the stops 389, the piston motion in that direction will stop.

Piston stops for the outer piston assembly 250 preferably include radially stepped portions 390 and 391 spaced on either side of the outer plungers 295 and 296 of the first and second pull rods 293 and 294, respectively. The pump block 302 and seal plugs 311 and 313, in a similar fashion to the inner piston assembly 200, will include matching stops 392 and 393, located on opposite ends of the first and second pull rod bores 310 and 312, respectively.

As an alternative, the piston stops may be eliminated. With this configuration, the head 210 of the first inner piston 202 hitting the head 254 of the first outer piston 252 will act as a stop in one direction, while the head 222 of the second inner piston 220 hitting the head 276 of the second outer piston 275 will act as a stop in the other direction. While this may at first seem undesirable, the piston heads have relatively large surface areas for contact, and, the pressure within the cylinder where the pistons are acting as stops will rise dramatically just prior to collision, thus slowing the speed at impact.

The hydraulic pump block assembly 12 also preferably includes a pair of position sensors. A first position sensor 395 is mounted in the pump block 302 surrounding the portion of the first guide rod 244 that includes the first set of copper rings 246. Preferably, a second position sensor 396 is mounted in the pump block 302 surrounding the portion of the second guide rod 245 that includes the second set of copper rings 247. The position sensors 395 and 396 are electrically connected and provide position signals to the electronic controller 35. With the sensor information from the first position sensor 395, the electronic controller 35 can determine the position and velocity of the inner piston assembly 200. The information from the second position sensor 396 is preferably used for calibration of the first position sensor 395.

The operation of the engine 10 will now be described. Since this engine 10 is a free piston engine, the piston motion is determined by a balance (equilibrium) of forces acting on the piston assemblies 200 and 250. For example, the major forces are generally in-cylinder pressures of the opposed engine cylinders 44 and 144, the friction created by the various moving parts, the air scavenging, the inertia of the moving piston assemblies 200 and 250, and any loads caused by the plungers 242, 295 and 296. Consequently, the piston assemblies 200 and 250 each must receive input forces at the appropriate time and amount in order to cause sustained reciprocal piston motion. This reciprocal motion must be sufficient to obtain the needed compression in the cylinders 44 and 144 for the combustion process. By employing inputs to control the motion of the piston assemblies 200 and 250, especially near the end of travel for each stroke, the piston top dead center positions, and hence the compression ratio, can be controlled. Moreover, the ability to vary the compression ratio makes HCCI combustion much more feasible, since the compression ratio needed to cause combustion can vary based on engine operating conditions. Since the balance of forces must be precisely timed and controlled, the electronic controller 35 monitors and actuates the engine components that are critical for efficient and sustained engine operation.

Prior to engine start-up, the high-pressure reservoir 338 of the hydraulic system 329 retains a hydraulic fluid under a relatively high pressure, which may be, for example, 5,000 to 6,000 pounds per square inch (PSI). The low-pressure reservoir 330 of the hydraulic system 329 retains hydraulic fluid under a relatively low pressure, which may be, for example, 50 to 60 PSI.

Upon initiation of the engine starting process, the electronic controller 35 energizes the starting and control valve 379, alternating between a first valve position with the high pressure port 380 open to the inner pumping chamber port 382 and the low pressure port 381 open to the outer pumping chamber port 383, and a second valve position with the high pressure port 380 open to the outer pumping chamber port 383 and the low pressure port 381 open to the inner pumping chamber port 382.

In the first valve position of the control valve 379, fluid from the high pressure reservoir 338 will be pushed into the inner pumping chamber 306, causing the inner plunger 242 of the push rod 240, and hence the entire inner piston assembly 200, to begin moving to the right (as illustrated in the figures herein). This will cause the fluid in the inner coupler pumping chamber 308 to be pushed through the first and second cross connecting passages 322 and 323 and into the first and second outer coupler pumping chambers 316 and 320. This, in turn, will cause the first and second outer plungers 295 and 296 of the first and second pull rods 293 and 294, respectively, and hence the entire outer piston assembly 250, to begin moving to the left (as illustrated in the figures herein). As the outer piston assembly 250 moves to the left, fluid from the first and second outer pumping chambers 314 and 318 will be pushed through the control valve 379 and into the low pressure reservoir 330.

This opposed movement of the two piston assemblies 200 and 250 will cause the first outer piston 252 and first inner piston 202 to simultaneously move apart toward their bottom dead center positions in the first engine cylinder 44, while the second outer piston 275 and second inner piston 220 will move simultaneously at one another toward their top dead center positions in the second engine cylinder 144. Both piston assemblies 200 and 250 move back and forth along a single, linear axis of motion. The single axis of motion extends through the center of the two engine cylinders 44 and 144, as indicated by the double arrows shown in the engine cylinders 44 and 144 in FIGS. 10 and 11.

In the second valve position of the control valve 379, fluid from the high pressure reservoir 338 will be pushed into the first and second outer pumping chambers 314 and 318, causing the first and second outer plungers 295 and 296 of the first and second pull rods 293 and 294, respectively, and hence the entire outer piston assembly 250, to begin moving to the right. This will cause the fluid in the first and second outer coupler pumping chambers 316 and 320 to be pushed through the first and second cross connecting passages 322 and 323 and into the inner coupler pumping chamber 308. This will, in turn, cause the inner plunger 242 of the push rod 240, and hence the entire inner piston assembly 200, to begin moving to the left. As the inner piston assembly 200 moves to the left, fluid from inner pumping chamber 306 will be pushed through the control valve 379 and into the low pressure reservoir 330.

This opposed movement of the two piston assemblies 200 and 250 will cause the first outer piston 252 and first inner piston 202 to simultaneously move at one another toward their top dead center positions in the first engine cylinder 44, while the second outer piston 275 and second inner piston 220 will move simultaneously away from one another toward their bottom dead center positions in the second engine cylinder 144.

By precisely and rapidly switching between the three valve positions of the starting and control valve 379, the piston assemblies 200 and 250 can be made to alternately switch between causing compression in the first engine cylinder 44 and causing compression in the second engine cylinder 144. The electronic controller 35, by monitoring the position sensors 288 and 395, determines the position and velocity of both piston assemblies 200 and 250. The position and velocity information is then employed by the controller 35 to determine the appropriate timing for the switching of the starting and control valve 379 in order cause the desired amount of compression ratio in the engine cylinders 44 and 144. One can see from this discussion, then, that the starting and control valve 379 controls the movement of the piston assemblies 200 and 250 at engine start-up in a way that will cause the piston assemblies 200 and 250 to move as needed for engine operation.

The engine 10 operates as a two stroke engine, and without any separate valve system to open and close the intake and exhaust ports of the engine cylinders 44 and 144. Thus, the compression, combustion (which includes ignition), expansion, and gas exchange (which includes intake and exhaust) of the fuel/air mixture is accomplished over two strokes of the pistons. This arrangement minimizes the number of moving parts as well as minimizing the total package size of the engine 10.

The movement of the inner piston assembly 200 causes the inner pistons 202 and 220 to selectively block and open the exhaust ports 46 and 146 to the respective engine cylinders 44 and 144. The movement of the outer piston assembly 250 causes the outer pistons 252 and 275 to selectively block and open the intake ports 56 and 156 to the respective engine cylinders 44 and 144, as well as causing the piston bridges 264 and 282 to charge the intake air. The movement of the outer piston assembly 250 also causes the outer pistons 252 and 275 to selectively block and expose the fuel injectors 34 and 134, respectively, to the engine cylinders 44 and 144. Consequently, the motion of the inner and outer piston assemblies 200 and 250 caused by the starting and control valve 379 provides the movement needed to bring air charges into the engine cylinders 44 and 144, allow for fuel to be supplied into the cylinders to mix with the charge air, and provide compression sufficient for combustion to occur.

Preferably, the combustion process under normal operating conditions is a homogeneous charge, compression ignition (HCCI) type, which takes advantage of the variable compression ratio capability of this engine 10 to allow for this very high efficiency type of combustion. The HCCI process employs a homogeneous air/fuel charge mixture that is auto-ignited due to a high compression ratio; that is, pre-mixed fuel/air charges are compression heated to the point of auto-ignition (also called spontaneous combustion). With the auto-ignition caused by the HCCI process, there are numerous ignition points throughout the fuel/air mixture to assure rapid combustion, which allows for low equivalence ratios (the ratio of the actual fuel-to-air ratio to the stoichiometric ratio) to be employed since no flame propagation is required. This results in improved thermal efficiency while reducing peak cylinder temperatures, significantly reducing the formation of oxides of nitrogen versus the more conventional types of internal combustion engines. Although, if so desired, spark plugs may be employed in each engine cylinder, with the engine operating as a spark ignition engine.

More specifically, the intake, compression, combustion and exhaust events will be described for the first engine cylinder 44 (being equally applicable to the second engine cylinder 144) during normal HCCI engine operation. The movement of the first outer piston 252 charges the intake air as well as determines the timing and duration of the air intake ports 56 and first fuel injector 34 being open to the first engine cylinder 44. As the first outer piston 252 moves toward its top dead center position, the volume in the main pumping chamber 78 of the first scavenge pump 74 increases, causing air to be pulled in through the inlet reed valves 94.

After top dead center—typically after a combustion event—the movement of the first outer piston 252 reduces volume in the main pumping chamber 78, causing the air to be compressed and forced out through the outlet reed valves 95 and into the air intake passages 93 and 72 and the intake channel 31. As the first outer piston 252 continues to move toward its bottom dead center position, the electronic controller 35 will determine, from the position sensor 288, that the first outer piston 252 has moved far enough to expose the first fuel injector 34 to the first engine cylinder. The electronic controller 35 will then activate the fuel injector 34 for a time interval that is based upon the engine and hydraulic system operating conditions as well as the fuel pressure measured by the fuel pressure sensor 41. As the first outer piston 252 continues toward its bottom dead center position, it will expose the air intake ports 56, allowing the compressed air to flow into the first engine cylinder 44 from the intake channel 31. The incoming air will entrain and mix with the fuel sprayed into the incoming air charge. This timing of fuel injector and intake port opening generally allows for a relatively long mixing time for the air and fuel, which will tend to create a more homogeneous mixture. This homogeneous mixture is very desirable for HCCI combustion. Preferably, the fuel injector 34 is configured to produce very fine fuel droplets in order to obtain a short penetration of the fuel in the cylinder. This will help to avoid wall wetting on the cylinder wall opposite the injector 34. Moreover, it is believed to be preferable that the nozzle 55 has a wide spray cone angle—even as high as ninety degrees. This is believed to help with the mixing of fuel and air since the air flows in through the intake ports 56 around the entire circumference of the engine cylinder 44. Also, the air intake ports 56 are preferably angled to create a swirl as the air enters the first engine cylinder 44, which is believed to further improve the mixing of air and fuel. Due to the configuration of the first engine cylinder 44 and first outer piston 252, as well as the location of the fuel injector bore 54, it is likely that only a medium pressure, low momentum injector may need to be employed. This type of injector is less costly than the high pressure fuel injectors typically required in a conventional direct injection system.

After reaching bottom dead center, the first outer piston 252 moves toward the top dead center position again. During this movement, the first outer piston 252 will close off the air intake ports 56 and the fuel injector bore 54 from the first engine cylinder 44. Since the fuel injector bore 554 is blocked by the first outer piston 252 during a portion of the piston stroke, the fuel injection system needs to be able to inject all of the needed fuel during the time bore 54 is exposed to the first engine cylinder 44. The air/fuel charge is now compressed as the first outer piston 252 continues to move toward the top dead center position. One will note that the first fuel injector 34 injects directly into the first engine cylinder 44, yet the nozzle 55 is not directly exposed t the combustion event since it is covered by the first outer piston 252 when the piston 252 is at or near top dead center. This is advantageous because the nozzle 55 will not be exposed to the extreme temperatures and pressures that are present in the first engine cylinder 44 early in the combustion event. Thus, being exposed only to the relatively lower temperatures and pressures later in each combustion event, a less costly fuel injector may be employed.

The movement of the first inner piston 202 determines the timing and duration of the exhaust ports 46 being open to the first engine cylinder 44. As the first inner piston 202 moves away from top dead center—typically after a combustion event—the piston 202 will move past the exhaust ports 46, allowing the exhaust gases to flow out through the exhaust ports 46. The exhaust gasses will then flow through the first exhaust gas scroll 20 and out through rest of the exhaust system (not shown). After bottom dead center, the first inner piston 202 moves toward top dead center and, part of the way through this stroke, will cover the exhaust ports 46, effectively closing them. Any exhaust gasses that have not flowed out through the exhaust ports 46 at this time will remain in the cylinder 44 as internal exhaust gas recirculation (EGR) during the next combustion event. Moreover, with the first inner piston 202 covering the exhaust ports 46, the fresh fuel/air mixture will be prevented from flowing out into the exhaust system. This is a particular advantage with this engine configuration—that is, with the intake ports 56 and fuel injector bore 54 spaced a significant distance from the exhaust ports 46. As the first inner piston 202 continues to move toward top dead center, the air/fuel charge is compressed, generally until combustion occurs.

Since the second engine cylinder 144 operates opposed to the first engine cylinder 44, the combustion event in the first engine cylinder 44 will cause the first inner and outer pistons 202 and 252 to be driven apart while the combustion event in the second engine cylinder 144 will cause the first inner and outer pistons 202 and 252 to move toward one another (causing compression in the first cylinder 44), thereby continually perpetuating the engine operating cycle. The self-sustaining operation of the engine 10, then, is maintained by controlling the fuel injection prior to each of the combustion events, taking into account the various engine and hydraulic system operating conditions. The fuel injection control can be used to control the length of the piston stroke, which must be enough to obtain the compression ratio needed for combustion but avoid collisions with the piston stops. Of course, to allow for transient conditions, occasional non-combustion events, system imbalances, and other factors, the starting and control valve 379 can be employed at times, in combination with the fuel control, to correct the piston motion. This includes assuring not only the appropriate compression ratio is reached for the given engine operating conditions, but also that the auto-ignition occurs at or just after the top dead center positions in order to avoid wasting combustion energy changing the direction of the motion of the piston assemblies 200 and 250.

During normal engine operation, as the combustion events cause the piston assemblies 200 and 250 to reciprocate, the push rod 240 and pull rods 293 and 294 will drive the plungers 242, 295, and 296 back and forth in their respective bores 304, 310, and 312. As the inner piston assembly 200 moves to the right (as seen in the figures), movement of the inner plunger will cause the inner set of low pressure check valves 360 to open, allowing fluid from the low pressure rail 356 to be drawn into the inner pumping chamber 306. The fluid leaving the low-pressure rail 356 is replenished from the low-pressure reservoir 330. The amount of fluid maintained within the low pressure rail 356 and the ability of the low pressure reservoir 330 to refill the low pressure rail 356 must be sufficient to maintain the fluid flow through the sets of low pressure check valves. Otherwise, cavitation problems can occur.

At the same time, the outer piston assembly 250 moves to the left, with the outer plungers 295 and 296 causing the fluid in the first and second outer pumping chambers 314 and 318 to be pumped through the first and second outer high pressure check valves 371 and 372 to the high pressure rail 368. This displaces fluid into the high pressure reservoir 338. This fluid under pressure in the high-pressure reservoir 338 is then available as a stored energy source for the engine operation as well as driving other components and systems. Since the hydraulic fluid energy available is a function of the pressure level and the amount of hydraulic fluid flow, one can use the desired energy output when deciding upon the piston stroke, the piston frequency and/or the dimensions of the hydraulic fluid plungers when initially laying out the dimensions for the engine. For the piston frequency, generally, the higher the mass of the moving piston assemblies, the lower the optimal operating frequency of the engine.

During the engine stroke that causes the inner piston assembly 200 to move to the right, the inner plunger 242 pumps fluid from the inner coupler-pumping chamber 306 to the two outer coupler-pumping chambers 316 and 320. As discussed above, this allows the two-piston assemblies 200 and 250 to maintain an opposed motion to one another. If the position sensors 288 and 395 detect that the two piston assemblies 200 and 250 are not centered appropriately in the engine cylinders, then one of the coupler adjustment valves 328 and 336 can be activated to correct for the offset.

During the following engine stroke, as the inner piston assembly 200 moves to the left, the fluid pressure created by the inner plunger 242 will open the inner high pressure check valve 370, forcing fluid to flow to the high pressure rail 368 and on to the high pressure reservoir 338. The outer piston assembly 250 simultaneously moves to the right, with the outer plungers 295 and 296 causing fluid to be drawn from the low pressure rail 356 through the first and second outer sets of low pressure check valves 362 and 363. During this engine stroke, the outer plungers 295 and 296 also pump fluid from the outer coupler pumping chambers 316 and 320 to the inner coupler pumping chamber 306.

Accordingly, since the inner piston assembly 200 and outer piston assembly 250 always move opposed to one another—and hence the inner plunger 242 always moves opposed to the two outer plungers 295 and 296—each stroke of the engine provides only for either the inner plunger 242 or the outer plungers 295 an 296 to pump fluid to the high pressure reservoir 338. The opposite stroke direction in each case will operate to pump fluid around in the coupling system. If, on the other hand, one desires to obtain pumping action into the high pressure reservoir in both directions for both the inner and outer plungers 242, 295 and 296, then a different type of coupling system should be employed.

In addition to the operation of the subsystems that are internal to the engine, of course, the external systems will also function during engine operation as needed to maintain the operation of the engine 10. Thus, the cooling system will pump coolant through the coolant passages 28, 50, 66, 128, 150, 166, and 352 as needed in order to assure that engine components do not overheat. Also, the fuel system 39 will store and provide fuel to the fuel injectors 34 and 134 at the desired pressure. The electrical system will provide electrical power to the controller 35, sensors and other components requiring electrical power to operate. The oil supply system will provide lubricating oil to the engine as needed for providing lubrication to certain components. And, the air intake system will provide air to the air inlets 92 and 192 as needed during engine operation.

Although the fluid employed for the energy storage medium and the control valve has been disclosed as hydraulic oil, other suitable fluids may also be employed if so desired. For example, the fluid may be a gas, with a pneumatic energy storage system for the reservoirs. The fluid may be a refrigerant that can be in the liquid or gaseous state. In both of these examples, since the fluid is no longer a liquid (being generally incompressible), the coupling system employed to assure the opposed motion of the two piston assemblies would also change. However, the OPOC free piston engine configuration, especially one employing HCCI combustion, can still be used to produce the energy stored in the fluid energy storage medium.

Moreover, while the exemplary embodiment of an OPOC free piston engine discussed in detail herein employs a hydraulic fluid as the energy storage and control medium, the OPOC free piston engine that may employ linear alternators for engine control and electrical energy production. The hydraulic pump block assembly would be replaced with a linear alternator assembly, with the pull and push rods forming a part of or driving linear alternator components. The piston/cylinder assemblies—including scavenge pumps—would operate to produce energy from combustion events to drive the linear alternators. So, HCCI combustion, with the desired high quantities of charge air, can still be employed with the OPOC free piston engine coupled to a linear alternator, as is preferred for maximizing the power density of the engine.

While certain embodiments of the present invention have been described in detail, those familiar with the art to which this invention relates will recognize various alternative designs and embodiments for practicing the invention as defined by the following claims.

What is claimed is:

1. A free piston engine comprising:
   an energy generation and control assembly having a first side;
   a first combustion cylinder assembly located adjacent to the first side and including a first cylinder liner having a generally cylindrical wall that defines a first engine cylinder, which is centered about an axis of motion, and with the wall including at least one intake port and a fuel injector bore, adjacent to the at least one intake port, extending therethrough;
   a fuel injector having an injector nozzle and being mounted to the engine such that the injector nozzle is located in the fuel injector bore;
   a piston assembly including a first piston having a head portion, an opposed rear portion and a cylindrical side wall extending therebetween, with the cylindrical side wall generally centered about and extending in the direction of the axis of motion, and with the first piston being located and telescopically slidable within the first engine cylinder along the axis of motion a generally predetermined distance that defines a piston stroke; and
   wherein the locations in the wall of the at least one intake port and the fuel injector bore are such that the cylindrical side wall will cover the at least one intake port and the fuel injector bore for only a portion of the piston stroke.

2. The free piston engine of claim 1 wherein the fuel injector is oriented such that the injector nozzle is angled toward the at least one intake port.

3. The free piston engine of claim 1 wherein the fuel injector includes a spray angle for fuel that is about ninety degrees.

4. The free piston engine of claim 1 wherein the at least one intake port is a plurality of circumferentially spaced intake ports.

5. The free piston engine of claim 1 further including an inner piston assembly including an inner piston located and telescopically slidable within the first engine cylinder along the axis of motion and having a head portion that faces the first piston, and an inner rod mounted to the inner piston and operatively engaging the energy generation and control assembly; and wherein the head portion of first piston faces the head portion of the inner piston, and the portion of the first engine cylinder located between the head portion of the first piston and the head portion of the inner piston defines a combustion chamber; and wherein the fuel injector bore is exposed to the combustion chamber only when the first piston is spaced a predetermined distance from the inner piston.

6. The free piston engine of claim 5 wherein the piston assembly further includes an outer rod mounted to the first piston and operatively engaging the energy generation and control assembly.

7. The free piston engine of claim 5 wherein the wall includes at least one exhaust port extending therethrough, and the inner piston includes a cylindrical side wall adjacent to the wall and is telescopically slidable in the first engine cylinder along the axis of motion a generally predetermined distance that defines an inner piston stroke, and the location of the at least one exhaust port is such that the cylindrical side wall of the inner piston will cover the at least one exhaust port for a portion of the inner piston stroke.

8. The free piston engine of claim 1 wherein: the energy generation and control assembly further includes a second side in opposed relation to the first side; the engine further includes a second combustion cylinder assembly located adjacent to the second side and including a second cylinder liner having a second generally cylindrical wall that defines a second engine cylinder, which is centered about the axis of motion, and with the second wall including at least one second cylinder intake port and second fuel injector bore, adjacent to the at least one second cylinder intake port, extending therethrough; the engine further includes a second fuel injector having a second injector nozzle and being mounted to the engine such that the second injector nozzle is located in the second fuel injector bore; and the piston assembly further includes a second piston having a second head portion, an opposed second rear portion and a second cylindrical side wall extending therebetween, with the second cylindrical side wall generally centered about and extending in the direction of the axis of motion, and with the second piston being located and telescopically slidable within the second engine cylinder along the axis of motion a generally predetermined distance that defines a second piston stroke, wherein the locations in the second wall of the at least one second cylinder intake port and the second fuel injector bore are such that the second cylindrical side wall will cover the at least one second cylinder intake port and the second fuel injector bore for only a portion of the piston stroke.

9. The free piston engine of claim 8 wherein the piston assembly further includes an outer rod mounted to the first piston and the second piston and operatively engaging the energy generation and control assembly.

10. The free piston engine of claim 1 further including a position sensor operatively engaging the piston assembly and a controller in communication with the position sensor such that the controller can determine when the cylindrical side wall is covering the fuel injector bore.

11. A free piston engine comprising:
an energy generation and control assembly having a first side;
a first combustion cylinder assembly located adjacent to the first side and including a first cylinder liner having a generally cylindrical wall that defines a first engine cylinder, which is centered about an axis of motion, and with the wall including at least one intake port and a fuel injector bore, adjacent to the at least one intake port, extending therethrough;
a fuel injector having an injector nozzle and being mounted to the engine such that the injector nozzle is located in the fuel injector bore;
an outer piston assembly including an outer piston having a head portion facing the energy generation and control assembly, an opposed rear portion, and a cylindrical side wall extending therebetween, with the cylindrical side wall generally centered about and extending in the direction of the axis of motion, and with the outer piston being located and telescopically slidable within the first engine cylinder along the axis of motion a generally predetermined distance that defines a piston stroke;
an inner piston assembly including an inner piston located and telescopically slidable within the first engine cylinder along the axis of motion and having a head portion that faces the outer piston; with the portion of the first engine cylinder located between the head portion of the outer piston and the head portion of the inner piston defining a combustion chamber; and
wherein the fuel injector bore is exposed to the combustion chamber only when the outer piston is spaced a predetermined distance or greater from the inner piston, thereby assuring that the cylindrical side wall will cover the fuel injector bore for only a portion of the piston stroke.

12. The free piston engine of claim 11 wherein the fuel injector is oriented such that the injector nozzle is angled toward the at least one intake port.

13. The free piston engine of claim 11 wherein the fuel injector includes a spray angle for fuel that is about ninety degrees.

14. The free piston engine of claim 11 wherein the at least one intake port is a plurality of circumferentially spaced intake ports.

15. The free piston engine of claim 11 wherein the inner piston assembly further includes an inner rod mounted to the inner piston and operatively engaging the energy generation and control assembly, and the outer piston assembly further includes an outer rod mounted to the outer piston and operatively engaging the energy generation and control assembly.

16. A method of operating a free piston engine comprising the steps of:
providing an energy generation and control assembly having a first side;
providing a first combustion cylinder assembly located adjacent to the first side and including a first cylinder liner having a generally cylindrical wall that defines a first engine cylinder, which is centered about an axis of motion, and with the wall including at least one intake port and a fuel injector bore, adjacent to the at least one intake port, extending therethrough;
providing a fuel injector having an injector nozzle and being mounted to the engine such that the injector nozzle is located in the fuel injector bore;
providing a piston assembly including a first piston having a head portion, an opposed rear portion and a cylindrical side wall extending therebetween, with the cylindrical side wall generally centered about and extending in the direction of the axis of motion, and with the first piston being located and telescopically slidable within the first engine cylinder along the axis of motion;

moving the first piston along the axis of motion so that the cylindrical side wall does not cover the fuel injector bore;

injecting fuel from the fuel injector into the first engine cylinder while the cylindrical side wall is not covering the fuel injector bore;

moving the first piston along the axis of motion so that the cylindrical side wall is covering the fuel injector bore; and igniting the injected fuel while the cylindrical side wall is covering the fuel injector bore.

17. The method of claim 16 wherein the step of injecting the fuel further includes directing the fuel injection in the general direction of the at least one intake port.

18. The method of claim 16 further including the steps of mounting a rod to the first piston, and operatively engaging the energy generation and control assembly with the rod as the first piston moves along the axis of motion.

* * * * *